United States Patent [19]

Nelson et al.

[11] Patent Number: 5,534,203

[45] Date of Patent: Jul. 9, 1996

[54] COMPOSITE POLE MANUFACTURING PROCESS FOR VARYING NON-CIRCULAR CROSS-SECTIONS AND CURVED CENTER LINES

[75] Inventors: Ronald H. Nelson; Dimitrije Milovich, both of Salt Lake City, Utah

[73] Assignee: Radius Engineering, Inc., Salt Lake City, Utah

[21] Appl. No.: 195,461

[22] Filed: Feb. 9, 1994

[51] Int. Cl.[6] .................................................. B27N 3/10
[52] U.S. Cl. ........................ 264/101; 264/137; 264/313; 264/314; 264/257; 264/571
[58] Field of Search ................................. 264/137, 101, 264/313, 314, 257, 571; 280/819

[56] References Cited

U.S. PATENT DOCUMENTS

| | | | |
|---|---|---|---|
| 3,596,921 | 8/1971 | Brackl | 280/11.37 L |
| 3,896,206 | 7/1975 | Beaver et al. | 264/258 |
| 3,974,012 | 8/1976 | Hogarth | 156/161 |
| 4,125,423 | 11/1978 | Goldsworthy | 156/428 |
| 4,157,181 | 1/1979 | Cecka | 273/80 R |
| 4,292,101 | 9/1981 | Reichert | 156/156 |
| 4,310,201 | 1/1982 | Pauwels | 303/110 |
| 4,679,813 | 7/1987 | Girard | 280/602 |
| 5,013,512 | 5/1991 | Malmström | 264/255 |
| 5,188,872 | 2/1993 | Quigley | 428/362 |
| 5,261,980 | 11/1993 | Pearce | 156/173 |
| 5,265,911 | 11/1930 | Goode | 280/819 |

FOREIGN PATENT DOCUMENTS

| | | |
|---|---|---|
| 9015387 | 6/1992 | France . |
| 9015388 | 6/1992 | France . |

*Primary Examiner*—James J. Bell
*Attorney, Agent, or Firm*—James L. Sonntag

[57] ABSTRACT

A composite ski pole is formed of fiber reinforced plastic laminates laid up around an inflatable bladder, and placed in a female mold. The bladder inflates to compact the laminates to substantially eliminate voids and form a smooth, hollow ski pole with a structurally strong and stiff skin. The molds may use compound shapes such as differing cross sections or longitudinal bends.

12 Claims, 10 Drawing Sheets

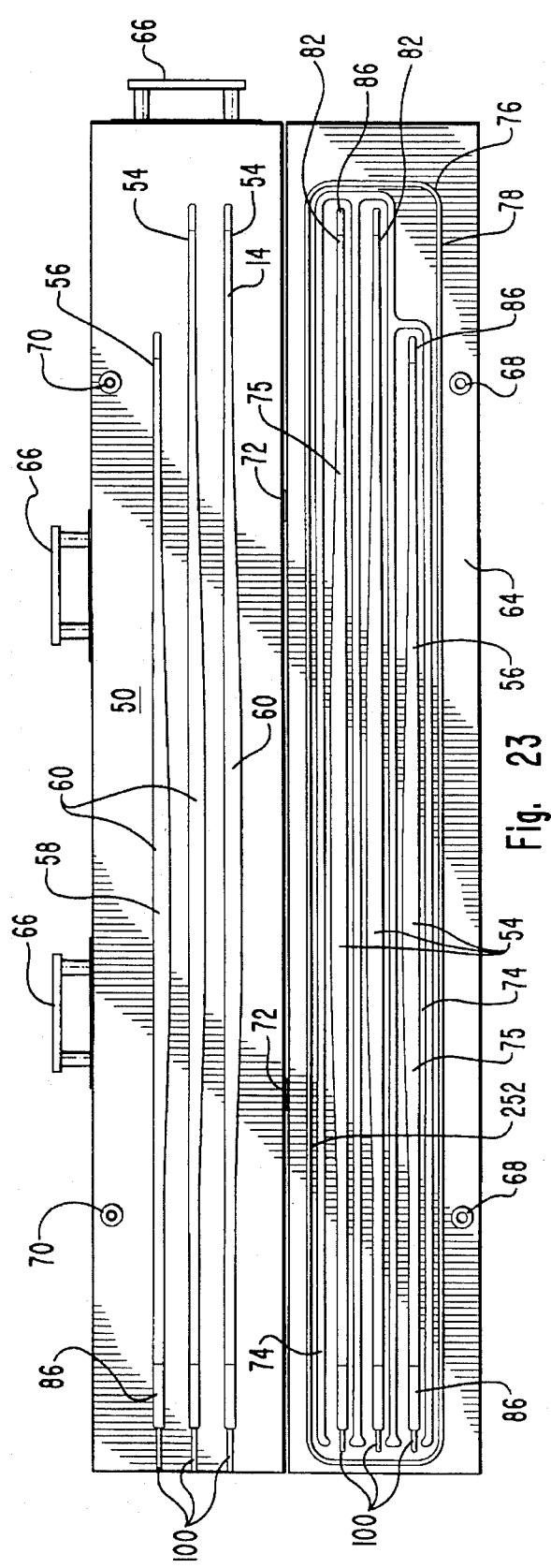
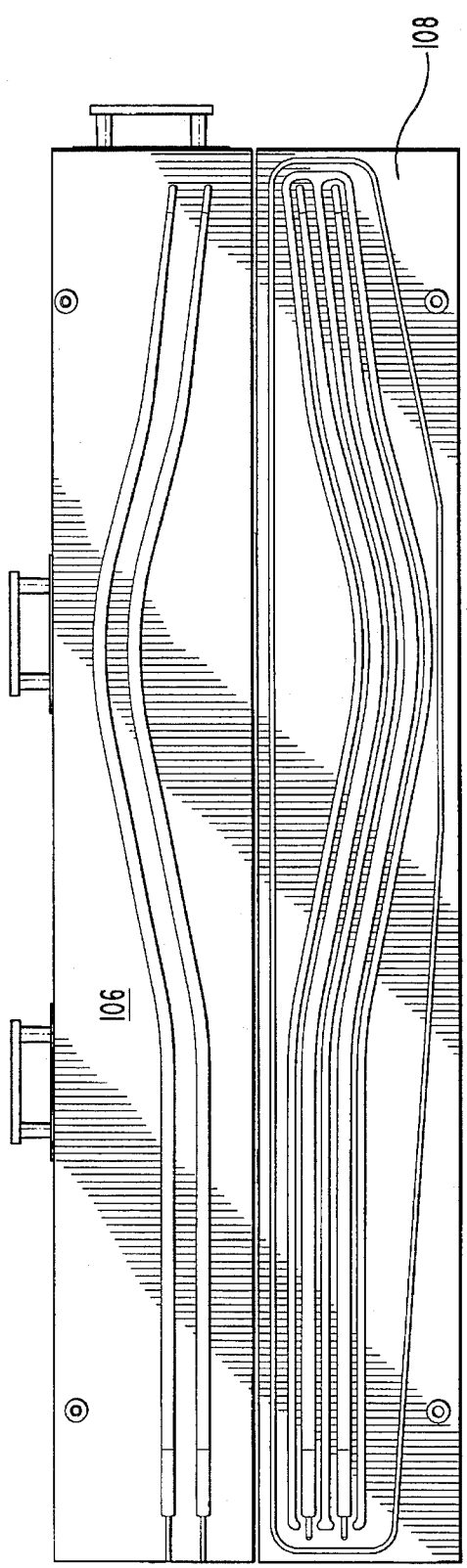
Fig. 23
Fig. 24

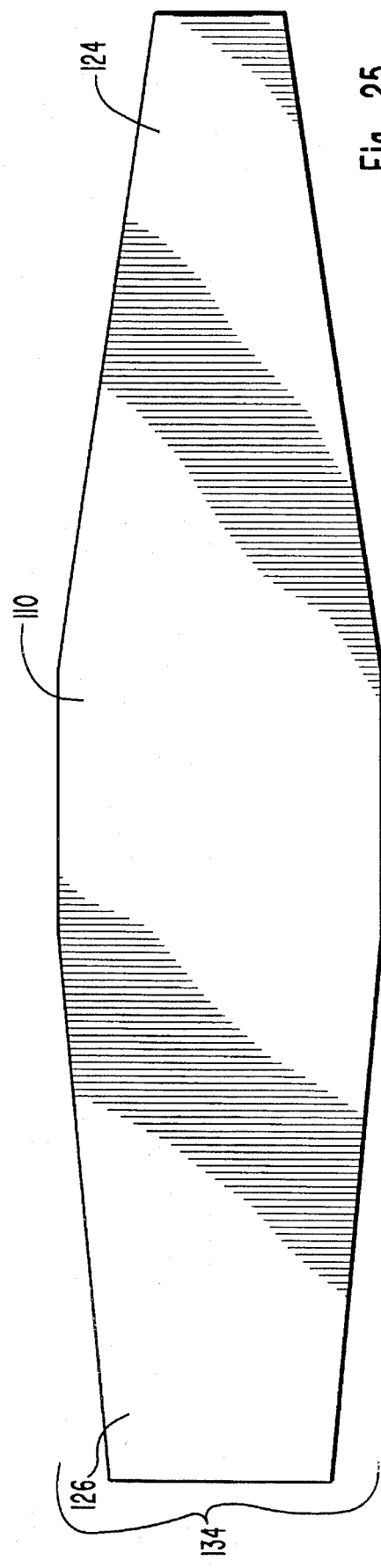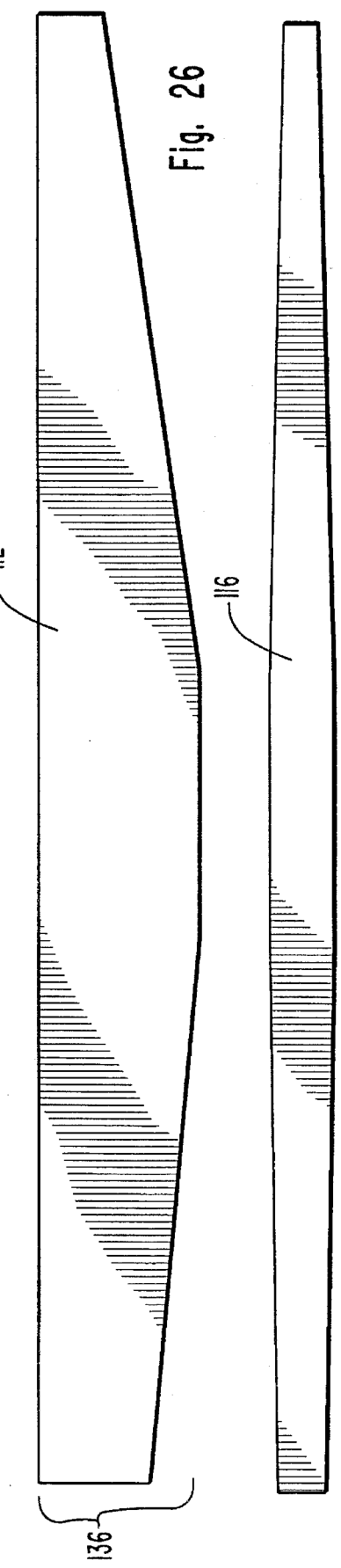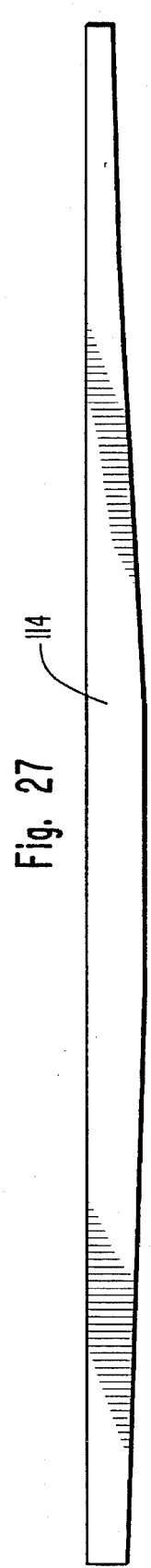
Fig. 25
Fig. 26
Fig. 27
Fig. 28

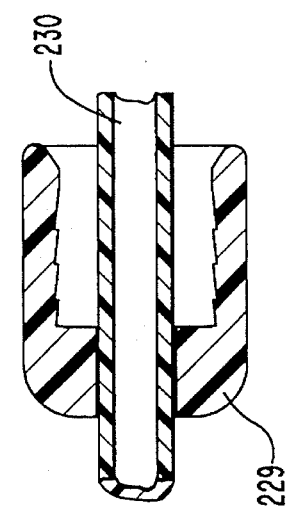
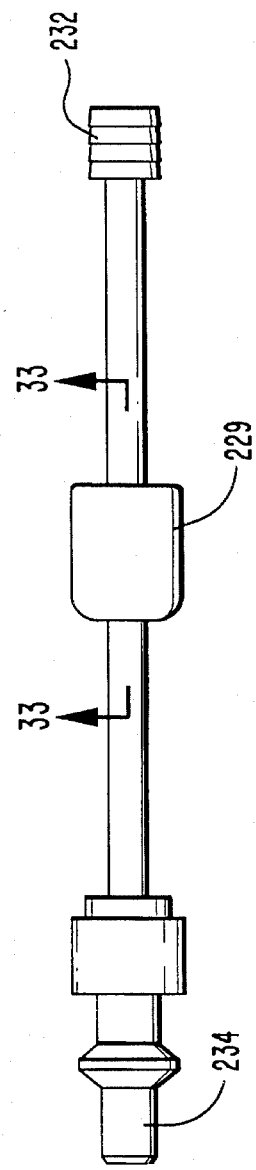
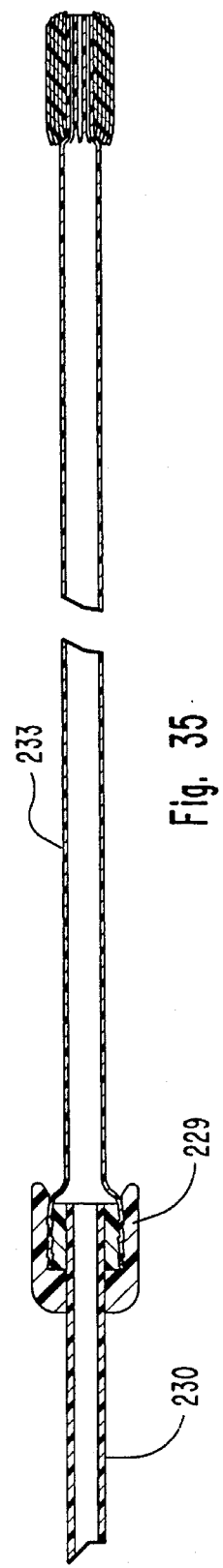
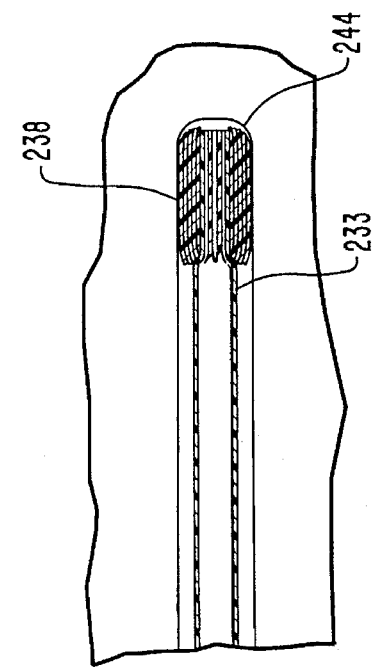
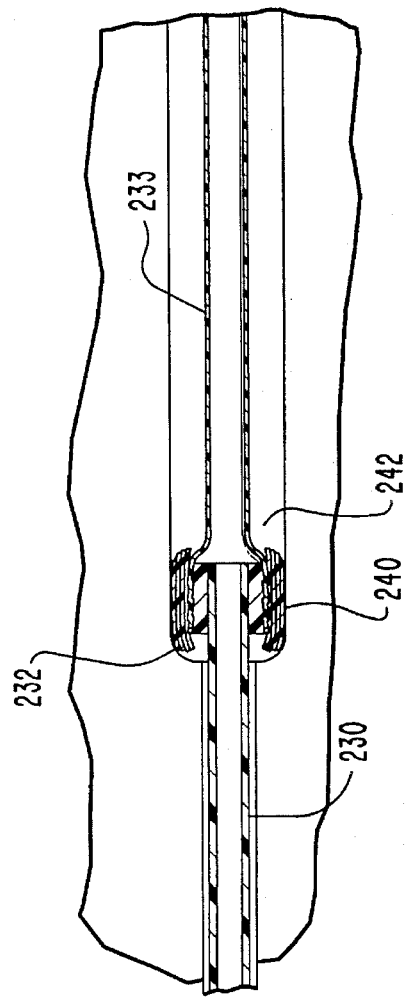
Fig. 33
Fig. 34
Fig. 35
Fig. 36

COMPOSITE POLE MANUFACTURING PROCESS FOR VARYING NON-CIRCULAR CROSS-SECTIONS AND CURVED CENTER LINES

FIELD OF THE INVENTION

The invention is a method for manufacturing fiber reinforced plastic composite poles, by placing an uncured plastic and fiber skin around an inflatable bladder. Placing this assembly in female molds, inflating the bladder and curing, produces a light and strong structure, requiring minimal, or no exterior finishing, which is believed to be superior to prior art methods, especially for poles having varying non-circular cross-sections, curved centerlines, or tapered shapes where the ends are smaller than the middle section. The use of the invention for the manufacture of cross country and alpine ski poles is described, although the manufacturing process is applicable to range of poles, shafts, or tubes constructed with fiber reinforced composite materials. Specifically identified applications include: golf shafts, oars, pole vault poles, sail board masts, sail board booms, fishing poles, and control linkage rods for aircraft. One possible characteristic feature of poles, shafts and rods amenable to the manufacturing methods of this invention, is that they are not rigidly attached at their ends, and therefore the loads are the highest in the middle of the pole/shaft/rod and therefore frequently a larger cross section is used in the middles than in the ends. The invention of the aerodynamic ski poles themselves, utilizes materials, a lay-up arrangement, and geometry which maximizes strength, reduces total weight and improves distribution of mass and provides additional advantages in specific use as ski poles.

BACKGROUND OF THE INVENTION

DESCRIPTION OF RELATED ART

Some modern ski poles utilize high performance composite materials to increase the strength and stiffness of the pole while reducing its weight relative to traditional aluminum poles. High performance composite materials have a lower density, higher specific strength and stiffness, and better damping qualities than traditional metals. Examples of higher performance reinforcing fibers include carbon or graphite fiber, Kevlar fiber, and boron fiber. When the continuous fiber type variety of these fibers are used in composites in high fiber volumes, generally greater than 50%, the resultant composite material will generally have mechanical and strength properties significantly better than metals for a given weight.

These properties are beneficial in the design and manufacture of high performance ski poles. High performance composite ski poles have been in use for cross country ski poles for over 15 years, but these are different from the method and the products disclosed here. The use of high performance composite materials in alpine or downhill ski poles has increased dramatically over the last five years. The increase in impact resistance in downhill poles which has been obtained by development of better pole designs has been the primary factor allowing more widespread use of composites in downhill ski poles, as has the consumer's increased demand for higher performance products. The impact conditions in the downhill ski environment are significantly greater than those experienced by a high performance cross country ski pole.

The vast majority of ski poles are of a circular cross section. Many of these are also longitudinally tapered, thereby having circular cross sections of decreasing size from the handle to the tip of the pole. Oval, elliptical, or aerodynamic ski poles have been developed previously, but have never been commercially successful. This has been caused by lack of a suitable manufacturing process capable of producing well designed non-circular cross section or bent centerline ski poles at commercially acceptable costs.

The invention comprises a manufacturing method and pole construction, which is particularly suitable for poles having varying non-circular cross sections and/or having curved centerlines. The invention provides a commercially viable way of manufacturing these types of pole designs, where none has existed previously. The manufacturing process utilizes a fundamentally different manufacturing approach than any known currently commercially utilized ski pole manufacturing process, and is also significantly different from, and unanticipated by any known process described in the technical or patent literature.

There appear to be no internal pressure bladder ski poles in the prior art. There are several determinates of a manufacturing process, the two key defining characteristics of a manufacturing process are how the fiber/resin material is positioned, and how pressure is applied. The internal pressure bladder process substantially changes the nature of both of these key aspects of the process relative to prior an.

The internal pressure bladder process initially positions the material on a very flexible substrate (probably the most flexible substrate possible) and the position of the material changes (it moves) significantly during the cure. The movement of the material inside the mold is far greater than any existing processes. Existing processes may move the material tens of thousands of an inch at most, whereas the process of the present invention moves the material at least a tenth of an inch, i.e. a factor of 100 increase.

The pressure is clearly applied completely by the pressure bladder in our process. The pressure bladder can be considered loosely analogous to, i.e. the interior tool, customarily a fixed dimension mandrel, in most prior art processes. The invention's application of pressure on the interior of the part can be controlled completely independent of any other process variable. The vast majority of composite tube making processes, including all known commercial processes making parts in any significant volume, apply the pressure to the outside of the part. Certain relatively short tapered tubes in non-analogous fields such as for vehicle frames use internal pressure bladders, but these are subject to different loads and forces than poles, as the are bonded at both ends, and the ends bear the greatest stress.

If a rigid interior mandrel and exterior tool are used, the pressure is applied perhaps equally by both tool portions, and is a function of some sort of relative mold motion (i.e. mold halves are closed), or the injection of liquid resin. Applying pressure through relative mold motion, i.e. closing the mold, provides generally external pressure and is significantly different from the process described in the present invention.

This is also a clumsy approach since fibrous material tends to flow out of the mold as it is closed, if a split female tool is used. If split female tooling is not used, there are very strong limitations on the geometric shape of the part.

Another alternative, believed to be used only in non-analogous arts, which provide some internal pressure is an expanding foam core. In this process, the skin is placed in a mold, and thermally (by heating or chemically) expanding foam placed inside the skin. When this is used, then the pressure application is directly related to the temperature of the tool, and not independently controllable. This severely limits process control, and maximum pressure levels. Further, the foam core is not generally removable, which is a huge disadvantage because of the added weight of the foam.

The composite ski pole industry is very heavily oriented to the use of hard internal mandrels, with pressure applied to the outside of the part during cure. These are believed to all use hard interior mandrels where at least the fiber is distributed precisely on the mandrel in a position very close to, if not exactly, where it will be in the finished part. The process of the present invention does not use a hard interior mandrel.

The other commonly used manufacturing method used for pole manufacture is pultrusion. Pultrusion is a fundamentally different process from that of the present invention. Several patents include manufacturing via pultrusion, although their primary teaching is not on pultrusion.

Several patents disclose a hard female tool in addition to the hard interior tool. These also use a hard female tool without split lines. The use of a hard interior mandrel, still make these approaches quite different than that of the present invention. The pressure application methods are also quite different. In these, the fiber or fiber/resin is positioned close to its final position, since the rigid tool doesn't change shape or expand significantly. There is teaching from one or more of these references, that split molds are undesirable, which is believed to teach away from this invention. Split line molds can create undesirable effects if rigid interior tooling is used, and the pole preform/interior tooling assembly is not smaller diametrically than the final pole dimensions. Because the present inventions utilizes a flexible interior tool with a pole preforms which is smaller than the final dimensions these problems are alleviated.

Some prior art patents teach the use of matched female tools and semirigid interior tooling, but these use foam cores. These patents use preforms formed initially very close their final shape, and do not use internal fluid pressurization. One uses an interior mandrel to supply the compaction pressure, but as discussed above, the limitations on the production of foam cored poles are severe. Since compaction pressure is low, composite strength to weight is low. The poles are heavier for a given strength. This and the fact that the foam must remain, makes for a much less desirable ski pole.

The fiber material in the present invention moves significantly during cure, and the original positioning of the fiber/resin skin, preferably a prepreg, on the bladder, prior to insertion in the tool, need not be very precise. The fact that one can relatively roughly apply the prepreg material (in a positional sense) on the bladder, in a shape significantly smaller than the finished part, and then move the material to its final shape during cure, is believed to be a considerable advantage in manufacturing efficiency, as well as being related to providing a stronger lighter pole because of the reduction of voids between prepreg laminations or layers.

Using this method reduces the labor and precision required to arrange the prepreg when fabricating the pole. This method allows the preform bladder assembly to be prepared out of the tool in a separate step and stored for a later cure. This method also allows the loading of hot molds with the bladder preform assembly which means the mold does not have to be cooled between cycles, significantly increasing production rate compared to forming the material on the hard tooling, either internal mandrel or female tool.

The method of the invention further eliminates, or substantially reduces, fiber flash during cure. Little or none of the fibrous part of the part is caught between the mold halves, which greatly reduces finishing costs and increases part structural integrity.

The method of accomplishing the step of supplying heat or an elevated temperature for curing is sometimes regarded as important, and the method here enables greater control over that step as well. The avoidance of mold cooling, the precision of the fit of the mold halves or portions, and the preparation of the bladder and prepreg insert all complement the control of the heating or other curing step.

Other external pressure methods include those of winding bundles of filaments around a solid mandrel, or braiding fibers around a solid mandrel. These have no way of applying internal pressure, and pressure, if applied at all, may act from the limited tension in the winding process, or from a subsequent step such as covering the tube with heat shrinkable plastic tape, cellophane or high-temperature thermoplastic, and shrinking the tubing to supply external pressure. A somewhat analogous process used is referred to as table rolling, where the prepreg is rolled around a mandrel, and pressure applied externally between the mandrel and a surface such as a table.

This is the most common method for manufacturing composite ski poles. When mechanized this process uses a "rolling table" machine to wrap prepreg material around a rigid mandrel. Table rolled composite ski poles use a plastic tape, cellophane or high-temperature thermoplastic, wrapped tightly around the laminate to compact the laminate and apply pressure to the laminate during cure. In this case the compaction pressure is applied with the circumferential tension in the tape. This tape is commonly called "shrink tape", however it probably does not actually shrink during cure, the initial winding tension provides the compaction pressure. The compaction pressure provided by shrink tape is on the order of 10 psi. to possibly 30 psi.

One patent describes generally straight, oval ski poles which have different bending properties in forward and lateral directions.

The composite materials used are generally heat curable synthetic resins reinforced with structural fibers. More specifically, the composite material used in construction of the poles contains a plurality of organic fiber layers, the fibers composing each layer being oriented at a specific angle depending on the design requirement, and all of these sheets being impregnated with a resin which hardens to form the finished component. In the preferred embodiment the resin is preimpregnated into the fiber beds prior forming of the poles, hence the commonly used term for this material form is "prepreg" composite. Prepreg composite is commonly available in standard form with a variety of different resins and reinforcing fibers from several different manufacturers. It is not necessary to use the prepreg form of the composite material to utilize this invention. For example, it is possible to manually add the resin to dry fiber material immediate prior to forming the pole. Also, it is relatively simple to envision that the resin can be injected into a closed mold into which a dry fiber pole preform/bladder assembly has been loaded.

ADVANTAGES AND OBJECTS OF CLAIMED INVENTION

The claimed invention consists of pole construction and manufacturing process which allows cost effective manufacture of poles having non-circular cross sections, double tapered cross sections with a maximum diameter in the middle, and poles with curved center lines. Current industry manufacturing methods do not allow the manufacture of these shapes, or in the cases where it may possible, the tooling and processing costs are prohibitively expensive.

The pole construction and manufacturing process has other advantages over current industry manufacturing methods. Primarily in terms of producing higher quality laminates and much better as molded external surface finishes. The higher laminate quality increases the mechanical strength and stiffness, and thereby allows the manufacture of lighter weight poles for a given structural performance, or higher strength and stiffer poles can be fabricated with the same weight.

EFFECT OF HIGH COMPACTION PRESSURE AND VACUUM ON LAMINATE QUALITY

Matched female molding tooling is used to form, define and control outer surface contours. A flexible internal pressure bladder is used to expand the preform and apply compaction pressure during cure. The bladder is pressurized with a fluid, a gas or liquid, with a pressure source located outside the molding tool. Application of the pressure is not dependent on thermal expansion or chemical reactions initiated by temperature changes in the interior tooling, as is the case in some foam cores used in the prior art. These other types of pressure sources are sometimes used in composite structure fabrication, possibly via the use of rubber or foam which might expand with the temperature increase during cure, or by the use of a foaming core material, which is a thermoset resin with a thermally initiated foaming mechanism added.

In the present invention, the timing of the application of pressure, and the amount of pressure can be optimized to produce the desired results. This allows the preform to be fully expanded to the mold walls, and allows a well compacted high resin-content low void-content laminate to be produced. Another possibility is cycling the pressure higher and lower during the process.

Very high bladder pressures can be used resulting in high laminate compaction pressures. Bladder pressures of generally 200 psi. to 250 psi. are used, which is roughly twice the value of the 100 psi. to 125 psi. used in the fabrication of high performance advanced composite aerospace components in pressurized autoclaves. Autoclaves, it will be recognized, apply this pressure externally.

The compaction pressure provided by prior art shrink tape is on the order of 10 psi. to possibly 30 psi. Therefore, the present invention utilizes compaction pressures roughly 6 times to 20 times greater than the standard industry table rolling manufacturing process. This high pressure greatly reduces void content, and lower resin contents can also be obtained.

Voids are created in composite laminates by either the presence of air which is entrapped during the initial construction of the uncured laminate, or by gas volatiles released during the heating and polymerization of the thermosetting resins. Regardless of which type of voids are present, high compaction pressures greatly increases the ability to drive the gases from the laminate and compact any remaining gas to a smallest size possible. For instance, one large source of gases in the laminate is the presence of water saturated in the resin prior to heating. Water is absorbed into the uncured resin quickly when exposed to natural humidity in the air. As the laminate is heated the water tends to form steam and create voids. High compaction pressures can create high hydrostatic pressures in the resin and therefore keep the water in solution in the resin. Also any air entrapped in the laminate and not expelled from the laminate during compaction will be reduced to a small fraction of its original size, since the laminate pressures in the present invention are from ten to 15 times higher than the natural ambient air pressure.

In the invention, a vacuum can be applied to the mold cavity prior to actuation of the internal bladder pressure, and even before heating of the mold. This allows removal of air from the preform prior to cure. This has not been found to be necessary for gentle bends and shapes shown as examples. However, if sharper bends or deeper mold cavities are used the application of vacuum can remove air which can otherwise become trapped between the preform and the mold cavity, producing small cosmetic defects on the surface. Adaptability to vacuum application is another advantage of this invention.

EFFECT OF UNDERSIZED PREFORM ON PART QUALITY AND TOOL CYCLE TIME

The preform is constructed of prepreg material and is formed substantially smaller than the final pole diameter around the bladder assembly. This has several benefits affecting manufacturability and pole quality. The preform-bladder assembly can be quickly and easily loaded into the mold, even if the mold is at a high temperature. Fast loading of the mold is required for high rate processing. The mold can be left at or near the full cure temperature if the preform-bladder assembly can be loaded into a hot tool. This substantially reduces the tool cycle time because the tool does not have to be heated and cooled between each cycle. Loading into a hot mold can reduce the in-press heated tool time by about 60%, because the heatup portion of the cure cycle is eliminated, and this portion of the heated time is heatup of the tool. Eliminating the need for cooldown before reloading, essentially eliminates one half of the total tool cycle time, since tool cooldown time is typically greater than the total in-press heated tool time. The net effect of these reductions is reducing the tool cycle time by about 75%. Therefore the production rate obtainable from a given tool and press can be increased by a factor four by running the tool at a nearly constant temperature near the full cure temperature. Reduction in tooling and capital equipment costs through greatly reduced tool cycle time is another advantage of this invention.

Making the preform smaller than mold also allows mold to be closed without portions of the preform being extruded outside of the part cavity during closing of the mold. This is a benefit because it eliminates reinforcing fibers from the part flash. Part flash in plastic parts is molding material (plastic or reinforced plastic) attached to the part which is caught in between the mold halves on the split lines rather than in the mold cavity. Part flash is common in the plastics molding industry, and it is trimmed off after the part is removed from the tool. Minimizing part flash is important because trimming is easier, and there is usually some visual remanent on the part from the parting plane flash. Minimizing part flash is even more important with reinforced plastics because trimming the flash is much more difficult, it effects part structural integrity, and it increases tool wear. Fiber reinforcement is found in flash generally only if caught between the mold halves as the molds are closed in non-injection molded composite parts. The gap between the mold halves is generally too small for significant amounts of fiber to wash out of the cavity during cure if the tool is well constructed. When fiber is caught between the mold halves, it holds the mold open locally and creates very high stresses in the mold at these locations. This tends to wear the tool in these locations. If the flash is only epoxy which normally flows out during compaction and cure, then it is easy to clean off the molded part, by simply scraping. However, if reinforcing fibers are present in the flash they must be cut or machined off by sanding or routing. Reinforcing fibers on the outside of the pole should play an important role in the structural performance of the pole, so if these fibers are extruded during loading or cure and then cut off, the structural properties are compromised.

COMPARISON TO ROLLING TABLE/SHRINK TAPE MANUFACTURING

As described above, the current state-of-the-art industry manufacturing technology for tapered composite tubes relies on the use of rigid or hard tooling on the inside of the part. Many references are found in technical literature. This approach is used for very low production of ultra high performance tubes used in satellites and space vehicles through the mass production of ski poles, windsurfing masts, golf shafts etc. The very high performance low production volume tubes use autoclave curing while the high volume applications rely on the use of "shrink tape" to apply pressure. As mentioned the use of rigid internal tooling is commonly accepted as the preferred method for constructing tubular articles. The underlying preference for this approach is partially due to the assumption that the prepreg material must be positioned to the near net dimensions which it will occupy in the final part. The various layers of prepreg material are placed at the desired orientations in the desired sequence on the rigid tool. This is the obvious and common sense approach to forming tubular articles. Rolling tables are used to compact the layers as they are applied so that very little movement of the prepreg material occurs subsequently during the cure. A rolling table is specially constructed low capacity press where the upper platen is allowed to move laterally relative to the lower fixed platen. The prepreg material is laid on the lower platen. A mandrel is laid on one edge of the prepreg material and the upper platen is lowered. The lateral motion of the upper platen then rolls the mandrel over the prepreg which sticks to the mandrel and wraps around the mandrel. Century Design Inc. of San Diego, Calif. supplies a large number of the rolling tables in use today. The rolling table applies a significant pressure during the rolling and therefore the prepreg is pressed tightly onto the previous layers and the mandrel. This minimizes entrapment of air and locates the prepreg material very close to its final location after cure. It is difficult to manually roll sheets of prepreg material tightly on a mandrel, especially for one person on a mandrel that exceeds 2 to 3 feet in length.

The prior art requires minimizing fiber motion during cure when using rigid interior tooling because any movement in the prepreg occurring during cure will generally produce waves in the reinforcing fibers. It is easy to understand that any net decrease in the radial (i.e. diametrical) location relative to the center of the tube of any circumferentially oriented (or any off axis ply) layers causes a wrinkle in the reinforcing fiber to occur because of the path of the fiber around the circumference of the tube is shortened. Therefore, in the prior art, an elaborate system of applying each layer or a few of the layers one at a time to the mandrel using a relatively expensive rolling table has been developed for the standard method of forming tubular articles. This is due to the inherent constraint that off-axial oriented plies cannot be allowed to move inward during cure if a rigid internal tool is used with pressure applied to the outside of the part. The invention's forming the preform on a flexible bladder and expanding it outward to a female tool eliminates the problem associated with inward radial movement of the prepreg material.

Conventional wisdom, as seen through the teachings of the prior art, assumes that rolling table shrink tape process is the lowest cost method for pole manufacture. The rolling table shrink tape process uses a large number of relatively inexpensive mandrels. A large number of mandrels are required because each mandrel is cycled once, or perhaps only twice a day. The rolling table shrink tape process is closer to a batch process based on a mass movement and processing of one set of mandrels through the manufacturing process. For example, a batch of mandrels are laid up on, shrink tape is wrapped on, and then the whole batch is oven cured. Relatively larger production space is required for all the mandrel flow which occurs in large groups. Far fewer matched female molds of the claimed invention are required to match the production rate described herein, than the number of mandrels required by existing processes.

The cycle time of the invention's tooling can be reduced to a small fraction of the cycle time of the rigid tooling used in table rolling process. The metal tool of the invention is on the outside of the part and heat is directly applied to the metal which comprises the great majority of thermal mass which must be heated in either type of process. The composite material is a fairly good thermal insulator in the direction perpendicular to the plane of the laminate, being close to the thermal conductivity of neat epoxy resin. The composite material on the outside of the rigid interior tooling used in the table rolling process insulates the rigid tooling which comprises the majority of thermal mass to be heated. A circulating air oven is used in the cure of shrink tape wrapped parts. This is a much less efficient way to conduct heat than directly heating the rigid tooling of the invention with heating platens which rely on conduction.

The invention has not been developed previously because it is counterintuitive to construct a preform from prepreg material which is located relatively imprecisely, has a loose construction that is very lightly compacted or uncompacted, which has significantly different shape the final part, i.e. smaller, and then put it loosely in a tool and expand to outward to the final shape. The preform-bladder assembly for the straight aerodynamic pole of this invention is essentially a constant diameter down its length, in spite of the fact that the cross section of the pole varies from a small diameter circle at the pole tip, to a large aerodynamic section in the middle of the pole, and then to an intermediate diameter circle at the pole grip area. In the prior art it has been assumed that adequate control of the positioning of each layer cannot be obtained without precisely locating it during the initial construction of the composite laminate, i.e. preform. In practice the approach of this invention works very well. Poles fabricated via this method have strength significantly exceeding that of poles fabricated with standard table rolling methods. The added strength permits reduced weight, and the method described herein enables functionally superior configurations of the resultant products.

The specific products disclosed herein, double taper poles, varying cross-section poles, and combinations of these have additional advantages over prior art shapes. For example in ski poles, the straight aerodynamic cross section pole is designed for recreational skiers and slalom ski racers. Minimum swing weight, minimum total weight, good impact resistance, high bending stiffness, and reduced wind drag are the primary features desired by serious skiers. The pole of the invention is equal to or better than any currently available ski pole in all these categories.

The preferred embodiment's straight pole has a weight roughly equal to a leading prior art composite alpine pole having a high durability and impact resistance in service. Alpine poles can be made lighter, but at the penalty of being less durable, which translates into a shorter service lifetime. This prior art pole (the Swix Cobra) is 13 mm. in diameter at the top and through the middle of the pole. For reference, aluminum poles are 18–19 mm. in diameter, a size needed to provide adequate bending stiffness and strength. The pole of the preferred embodiment is 13 mm. at the top and round, and goes to approximately a 14.1 mm. by 18.5 mm. teardrop shape in the middle. There are prior art small diameter composite ski poles, i.e. 11 mm., but these poles are relatively flexible, and skiers prefer a stiffer more predictable pole.

Calculations for the swing weight of the preferred straight pole, that is, the rotational inertia about the center of gravity of the pole, show that the rotational inertia is lower than all the competitors. The preferred embodiment straight pole has about 20% less rotational inertia than any high performance aluminum pole, it is also about 5% less than that of the Cobra, and is 13% to 19% lower than two competing small diameter composite poles. The rotational inertia actually has a stronger effect of a skier's impression for the feel of a pole than the total weight. Essentially, all ski poles (alpine and cross-country) are rotated or swung in actual use, as opposed to lifting the poles or simply translating the complete pole as the skier alternatively pushes, and moves the grip forward.

Further, the preferred embodiment straight pole has less aerodynamic drag in the middle of the pole than the prior art, and less total drag when considering the complete pole. The smaller diameter prior art poles might have a wind drag less than the preferred embodiment straight pole, but their design pays a severe penalty in terms of a low bending stiffness. Large diameter aluminum poles will have a much greater aerodynamic drag. The swing weight of the preferred embodiment straight pole is relatively lower than other poles because its large structurally efficient aerodynamic cross section is in the middle of the pole, precisely where extra strength and stiffness is needed.

Oval or streamlined aerodynamic ski poles have been made before, but not with a double tapered shape which is largest in the middle. Therefore, using a double tapered shape with puts the large efficient cross section where it is most structurally effective. The taper from the middle to each end in turn reduces the swing weight by concentrating mass near the center of the pole. It may be expected that many of the same concerns would be addressed in other art. For example, in a sailboard or other sailboat mast, it is important to preserve stiffness, provide an aerodynamic leading edge for the foil (sail) as well as reduce mass aloft, thereby enhancing stability.

The other embodiment disclosed herein is a bend downhill ski pole. A high bending stiffness is needed in the bent downhill pole to reduce axial deflection when the pole is loaded on its end as it is in a downhill race. The initial bend in the pole inherently makes the pole much less rigid for these types of loads, which requires that the pole design, i.e., diameters, wall thicknesses, materials, be modified.

This characteristic is especially important at the start of the downhill ski race event. At the start of the race, the racers highly load the pole on the end of the pole to raise themselves into the air a moment before the gate opens. Prior art poles for racers used large diameter, i.e. 19 mm., aluminum tubes. The prior art poles are sized 1" to 2" longer than necessary because of the excessive deflection of the pole at the start of the race. The invention's poles can be sized correctly because they are 3 times stiffer, this also has a much better solid feel in normal pole plants.

Wind resistance is a major concern at downhill racing speeds, of perhaps 70 mph. The invention's bent downhill pole has a cross section of 13 mm. by 18 mm. for most of its length, and it is elliptical. By design, the 18 mm. dimension is aligned with the bend in the pole, providing a large cross section in the plane where it is needed. The 13 mm. width is perpendicular to the direction of travel reducing wind drag. Again, use of lengthwise bends may provide advantages in other products, such as sailboard masts, and are particularly adaptable to use of the method of the invention, to produce light, strong, smooth poles of relatively complex shapes.

WRINKLING, POLE DESIGN FLEXIBILITY, AND EXTERIOR FINISH

Using female tooling and expanding the preform outward to the tool has many benefits relative to existing manufacturing technologies. Any off axis oriented layers are stretched and wrinkling is prevented. Fiber wrinkling causes large reductions in strength. In the case of the prior art rigid interior mandrel, it causes bulges in the outer surface.

Another advantage is that a far greater range of shapes can be produced because the shape is not constrained by the requirement that the rigid tooling be removable. The flexible bladder can be easily pulled out of the part regardless of the number and shape of the curves and cross sectional changes down the length of the pole. This allows a wide range of new shapes and pole designs. Another advantage is that far less attention to compacting the part during layup of the preform is required. The various layers can be loosely applied to the preform during construction since the compaction occurs during cure and wrinkling is not produced.

Another advantage is that the outer surface is formed against rigid tooling. Very little preparation of the surface is required after curing and before painting. In the rolling table and shrink taped oven cured approach the poles must be sanded or centerless ground on their exterior to form a smooth surface, after the shrink tape is stripped off the exterior with a special machine. The interior surface of poles fabricated using the table rolling process is very smooth, but this is not the surface which needs to be smooth from the perspective of the consumer, or aerodynamic considerations, which require a smooth exterior surface. The exterior surface of the parts of the invention is of such a high quality that the pole can be finished by only removing the resin flash and applying graphics. Painting can be eliminated if desired. The epoxy/fiber composite finish is much more durable than a painted surface, which can be scuffed, chipped, or scraped off.

This internal pressure bladder design allows reliable and uniform application of high pressures throughout the interior of the part during manufacture. The use of higher compaction pressures leads to higher structural performance, lower weight, much better as-molded surface finish, and lower finished cost through reduction of reject parts and finishing work. The high pressure process is required to obtain acceptably high shear strengths, while minimizing weight.

BRIEF DESCRIPTION OF THE DRAWINGS

FIG. 23 is a top plan view of an open mold for simultaneously forming three straight aerodynamic ski poles.

FIG. 24 is a top plan view of an open mold for forming a pair of bent downhill ski poles.

FIG. 25 is a top plan view of a first unidirectional fiber prepreg sheet used in forming the straight aerodynamic ski pole.

FIG. 26 is a top plan view of a second unidirectional fiber prepreg sheet used in forming the straight aerodynamic ski pole.

FIG. 27 is a top plan view of an outer layer of woven bidirectional fiber prepreg sheet used in forming the straight aerodynamic ski pole.

FIG. 28 is a top plan view of an inner layer of woven bidirectional multiple fiber prepreg sheet used in forming the straight aerodynamic ski pole.

FIG. 33 is a sectional view of a silicone rubber outer seal portion of a bladder as fitted on the bladder pressure line used in forming the ski poles.

FIG. 34 is a bladder fitting pressure line.

FIG. 35 is a fragmentary sectional view of the bladder fitting pressure line, bladder, bladder seal, and bladder tip seal.

FIG. 36 is a fragmentary sectional view of the bladder fitting pressure line, bladder, bladder seal, and bladder tip seal placed in the mold.

DETAILED DESCRIPTION OF THE PREFERRED EMBODIMENT

Figures 1, 2, 3:
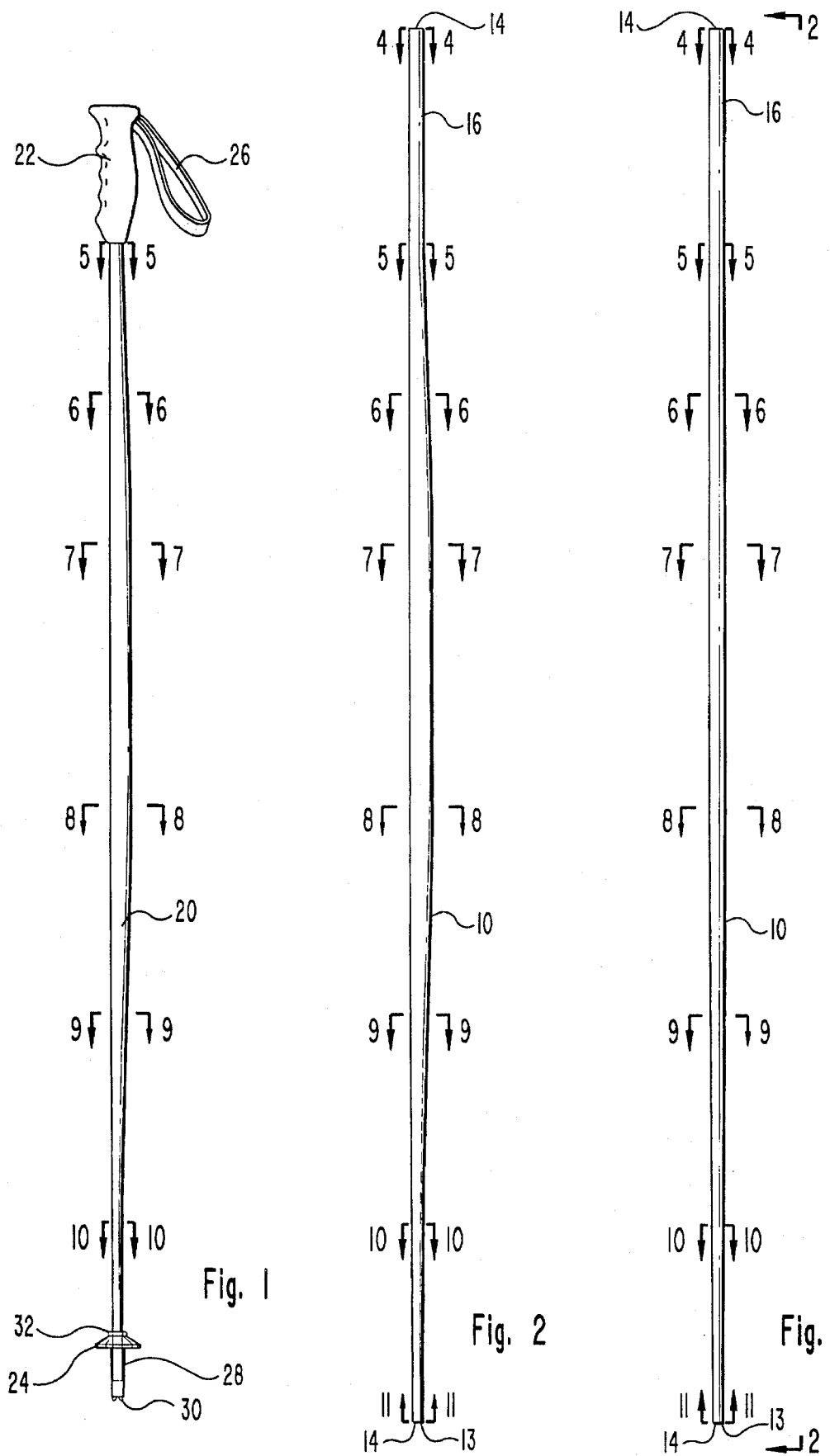
FIG. 1 is a side elevation view of a finished straight aerodynamic ski pole.
FIG. 2 is a side elevation view of a straight aerodynamic ski pole blank, before trimming and finishing.
FIG. 3 is a top plan view of a straight aerodynamic ski pole blank, before trimming and finishing.
Figure 4:
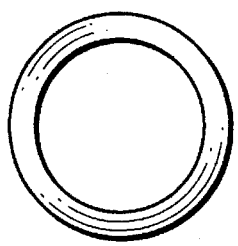
FIG. 4 is a sectional view of a straight aerodynamic ski pole taken at line 4—4 of FIGS. 2 and 3 showing a generally round section.
Figure 5:
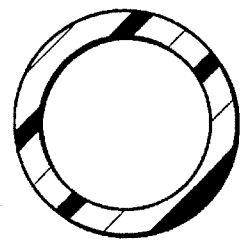
FIG. 5 is a sectional view of a straight aerodynamic ski pole taken at line 5—5 of FIGS. 2, 3 and 1 showing a generally round section.
Figure 6:
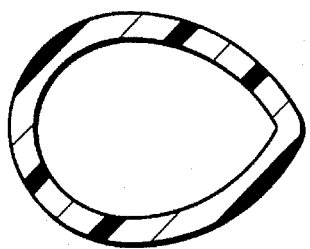
FIG. 6 is a sectional view of a straight aerodynamic ski pole taken at line 6—6 of FIGS. 2, 3 and 1 showing a generally teardrop shaped section.
Figure 7:
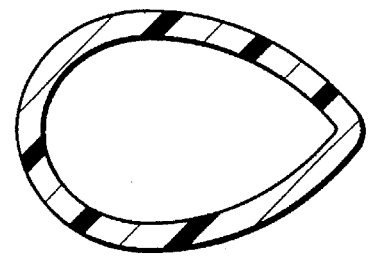
FIG. 7 is a sectional view of a straight aerodynamic ski pole taken at line 7—7 of FIGS. 2, 3 and 1 showing a generally teardrop shaped section.
Figure 8:
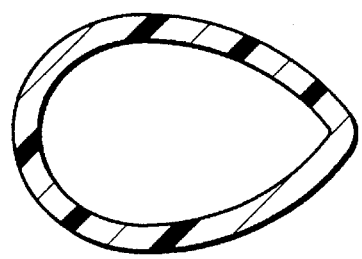
FIG. 8 is a sectional view of a straight aerodynamic ski pole taken at line 8—8 of FIGS. 2, 3 and 1 showing a generally teardrop shaped section.
Figure 9:
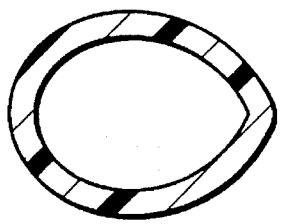
FIG. 9 is a sectional view of a straight aerodynamic ski pole taken at line 9—9 of FIGS. 2, 3 and 1 showing a generally teardrop shaped section.
Figure 10:
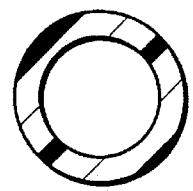
FIG. 10 is a sectional view of a straight aerodynamic ski pole taken at line 10—10 of FIGS. 2, 3 and 1 showing a generally round section.
Figure 11:
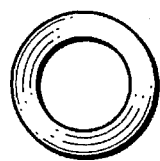
FIG. 11 is a sectional view of a straight aerodynamic ski pole taken at line 11—11 of FIGS. 2 and 3 showing a generally round section.

The manufacturing method of this invention is described in detail for use in the manufacture of cross-country and alpine types of ski poles, and the design and construction of alpine ski poles of this invention are also described in detail. However, the application of the manufacturing method to a range of different poles, shafts, and rods will become readily apparent after examining the application for ski poles. Application of this invention to golf shafts, oars, sail board masts, pole vault poles, sail board booms, fishing poles, and control linkage rods for aircraft is specifically intended. Use of the process with poles of other fibers, such as glass fiber reinforced plastic pole vault poles will also produce a superior product.

Sailboard masts are almost always straight tapered circular shafts. The majority of masts are constructed of composite materials, although aluminum is sometimes used. This geometry is essentially required by the current industry manufacturing process. These masts have the highest stresses near the middle of the mast where the booms attach and react the sail loads. The ability to cost effectively produce mast having a double tapered cross section, a varying non-circular cross section, or having a bent centerline will greatly increase the design flexibility for the masts, and therefore lead to the development of masts with higher aerodynamic performance. The combination of utilizing a non-circular cross section, an ellipse for example, with an initially curved centerline, could have complementary benefits roughly analogous to those discussed below for fishing rods. The use of non-circular cross sections allows the bending stiffness in the fore-aft and lateral planes to be tailored individually for optimum sail performance. The separate control of the bidirectional bending properties coupled with the use of an initially curved mast will allow a much higher control of sail shape than has been obtained in sailboards.

The methods of the present invention will also produce higher quality laminates with higher strengths, and the external surface finish will be improved considerably. Also, many masts are two-piece to simplify storage and transportation. There is a joint in the middle of the two sections, generally consisting of a secondary interior tube which fits inside both masts. It is anticipated that the joint designs which are allowed when using the manufacturing methods of this invention, will be eliminate this extra inner tube, since the step between the smaller diameter interior mating section and the main mast section can be connected by the same continuous composite laminate without having a discontinuous fiber junction.

Sailboard booms consist of two curved tubes which are connected to two fittings, one fitting which is fastened to the mast during use, and the other fitting is fastened to the back end of the sail in use. The boom tubes have a roughly semicircular bend to separate the boom tubes from the sail in use. The boom tubes are subjected to fairly large compressive loads by the sail tension. The combination of high compressive loads and the initial bend in the tube centerline produce the highest stresses near the middle of the boom tubes. Boom tubes are most frequently constructed of aluminum tubing, although composite boom tubes are available. The composite boom tubes that are currently available are fabricated over an essentially rigid mandrel, or set of mandrels, with shrink tape used for compaction of the composite during cure. The ability to cost effectively produce boom tubes with a varying cross section and with any bend desired will greatly increase design flexibility and therefore produce lighter, stiffer, and stronger boom tubes, more ergonomically matched to the sailors hands. For example, the boom tube cross section can be made elliptical in the middle of the boom tubes, while still being circular at the ends to mate with standard end fittings. This increases the strength and stiffness in the desired plane of bending, while allowing the sailor to more easily grasp the boom tubes. Other larger spars, such as for offshore boats, could feasibly be made by the process described herein, should marketplace economics dictate.

Control linkage rods for aircraft frequently consist of two end fittings and a rod connecting them. These rods are subjected primarily to compressive and tensile loads, and sometimes to torsional loads for rotatory actuator rods. Design for the compressive loads dictates that the middle section of the rod generally have a larger cross section than the middle to prevent column buckling and minimize weight. The design of rotatory actuator rods also dictates the use of larger cross sections in middle of the rod to forestall vibrational whirling phenomena. Using a smaller cross section at the ends also reduces the weight of the metallic end fittings, which can be a substantial portion of the total weight. Sometimes these rods have a bent shape to keep the rod from hitting other hardware on the aircraft. Currently, double tapered composite actuator rods must be fabricated using a meltable or water soluble interior mandrel, with pressure applied in an autoclave. This is a costly and slow process, which can be eliminated by the present invention.

Rowing oars are roughly similar to sailboard masts in size. Rowing oars also have the highest stresses in their middle section where attached to the boat. The extra design flexibility offered by the present invention will allow lighter and stronger oars to be produced. For example, the oar handle could be formed as a integral element of the oar. A slight bend might also be incorporated in the oar to optimize power transfer to the water by providing for optimum location of the oar blade in the water during the highest power portion of the rower's stroke.

Golf shafts are loaded most highly as the ball hits the club face, and introduces bending and torsional loads into the shaft. The generally accepted governing rules for golf equipment specified by the United States Professional Golf Association place strict design limits on the basic shape of the golf club shaft, requiring it to be basically straight and of an axisymmetric construction. However, the manufacturing methods of the present invention still allow significant improvements in golf club shaft performance to be obtained. Golf shafts made with the methods of the present invention can be made with very high fiber volumes while still maintaining low void contents. The majority of golf shafts are made with the table rolling, shrink taped, oven cured process. This current industry process produces shafts with fiber volumes of 58% to 62%. Void contents become unacceptably high if higher fiber volumes are attempted with table rolled process. Fiber volumes in excess of 75% have been demonstrated using the present invention, while producing void contents lower than those produced by the table rolled process. Use of a fiber volume this high would increase the material stiffness by roughly 25% relative to current industry processes, a very substantial improvement. Additionally, filament would golf shafts have been developed. The primary advantage of filament winding is that the shaft is closer to being purely axisymetric about its centerline than with the table rolled process. In table rolled shafts, the discrete sheets of prepreg material that have fibers oriented off axis from the shaft centerline, terminate at discrete points around the circumference of the shaft, and produce a discontinuity there. This discontinuity is very small and inconsequential for most applications, however it does produce a small variation in bending properties in different planes through the centerline of the shaft. The phenomena is commonly termed as the shaft has a spline. Filament winding eliminates these discontinuities by winding bundles of fibers which do not terminate except at the ends of the shaft. The fiber bundles are relatively large compared to the wall thickness and essentially smear together and form a macroscopically homogenous laminate and axisymetric shaft. Axisymetric shafts could also be produced with the processes of the present invention. Relatively narrow strips, roughly 0.5 inches to 5 inches wide depending on desired fiber angle with shaft centerline, can be spiral wrapped relatively loosely onto the bladder assembly to form the off centerline axis oriented plies. The bladder will expand the preform to the mold walls and create a macroscopically homogenous axisymetric shaft. This can not be done with the table rolling process because the use of the hard interior mandrel does not allow the fiber resin material to be smeared into a homogenous laminate.

In the table rolling process, the fiber stays where it is initially positioned, and if there are any overlaps or gaps between plies, they will show up as irregularities in the surface. A golf shaft formed with the methods of the present invention, would have a superior performance to any currently available shaft because high or ultra-high fiber volumes could be obtained, and a pure axisymetric structure could be formed because there would be no fiber terminations except at the ends of the shaft. Prior art filament wound shafts typically use a shrink tape overwrap and oven cure to compact the laminate, which limits the lamination pressures to low values.

Fishing rods are loaded similar to a cantilevered beam when a fish is being reeled in. The rod is essentially fixed by the fisherman's hands at its base. The upper end of the rod must be flexible to allow the very tip of the rod to bend parallel to the fishing line as the fish is being reeled in by the fisherman to reduce the stress in the rod and provide a smooth path for the fishing line. This desire of flexibility on the upper end of the rod is contrasted by the desire for a stiff rod which makes casting easier and transmits the vibrations of a fish taking the bait and hook to the fisherman. Fishing rods are generally straight and of circular cross section primarily due to the limitations of current industry manufacturing methods. A non-circular more aerodynamic rod cross section would reduce wind drag during casting. This would be a benefit in casting further, and in providing for a more direct link and feel between the fisherman and the fishing line. The characteristics of the rod which promote sensitivity and allow the fisherman to better feel the fishing line are extremely valuable for fly fishing. Incorporating an initial bend or curve in the upper portion of the rod would reduce the amount of bending required for the fishing to become aligned with the pole end. Reducing the amount of bending required for this alignment would allow a more rigid upper end of the rod to be used. The more rigid upper rod end would greatly enhance the fisherman's feel and control of the line. Simply changing the cross section of the pole to an elliptical shape might cause problems because the non-uniform bending properties of the pole would tend to make the rod twist over onto the more flexible bending plane when loaded, such as when reeling in a fish. This may be acceptable, for example the fisherman would cast with the pole rotated to align the rod for high stiffness, and when reeling in a fish the pole would be allowed to twist over.

Another solution would utilize an initially curved rod with an aerodynamic, perhaps elliptical, cross section. The initial bend would have the complementary effect of reducing or eliminating the tendency of the rod to twist under load. Relatively small design changes to the pole, as allowed by the present invention, could produce a substantial improvement in the handling of the rod in use, especially as evaluated by an experienced fly fisherman. These relatively minor design changes might consist of incorporating an initially curved section on perhaps the upper third to fourth of the rod, combined with utilizing an aerodynamic cross section such as an ellipse on the upper half to two thirds of the rod. This elliptical cross section transitions to a circular cross section near the base of the rod where the reel attaches. Furthermore, the rod exterior contours could be formed into a handle type shape in the handle areas.

The shape design flexibility afforded by the manufacturing method of the present invention allows these substantial performance improvements to be obtained. Additionally, the performance of simple straight tapered circular cross section rods themselves could be improved substantially, in a similar fashion to what is attainable with golf shafts as discussed previously, without any deviation from current external rod shapes.

The construction of pole vault poles by the methods of this invention would be similar in practice to that for golf club shafts, and the advantages would be similar. The primary advantage being that lighter weight poles could be made with the same strength and stiffness as existing poles. This would be obtained through higher fiber volumes and lower void contents. Poles vaults must be extremely strong and flexible. Fiberglass reinforcing fiber is used in pole vault poles because it has a high strain to failure, that is, its strength to stiffness ratio is very high. These requirements prevent the use of carbon fiber to reduce weight because the strain to failure of the carbon fiber is too low, i.e., it is too stiff even though it is strong enough. The methods of this invention provide one of the only means to reduce weight in this application, because the use of other reinforcing fibers is limited.

Two basic primary advantages of the manufacturing methods for poles, shafts, and rods, of this invention are self evident after examination of the previously described specifically intended applications for the present invention.

These include the following advantages: Additional design flexibility is offered in terms of layups, materials, and shapes. Significantly higher performance structures can be produced and higher quality laminates obtained. Higher fiber volumes, lower void contents, and better as-molded exterior surface finishes can be accomplished. These improvements can be obtained with a production cost similar to existing manufacturing methods.

DETAILED DESCRIPTION OF THE DRAWINGS

FIG. 2 shows a straight aerodynamic ski pole 10 as recently molded. Grip end 11 merges into shaft 12 and thence to tip end 13. Pole 10 is not trimmed to length. Tag end area 14 would be trimmed off, typically a ⅜" on each end, 11 and 13 for the finished pole. Additional material is trimmed off of top or grip end 11 for shorter poles, or a shorter preform is used in the cavity.

FIG. 1 shows the finished straight aerodynamic ski pole assembly, 20 has the pole trimmed to length, shown as 125 cm., with grip 22 and basket assembly 28 mounted thereon. The grip 22 would normally have a strap 26 for more secure handling. The two piece ski pole tip and basket assembly 28 includes pole tip receptacle 32 made of plastic with a hard metal insert 30 at the tip for improved wear. Receptacle 32 encases the tip portion of the shaft 132 of the finished pole. The basket 24, is generally a round circular disk shape. Preferably the basket 24 is snapped onto tip so as to allow changing of baskets for certain conditions. As can be seen by comparison of FIG. 2, and FIG. 3, the center portions of the pole have a greater depth in one dimension than the other, thereby providing an aerodynamic cross section.

FIG. 4 through FIG. 11 show the tip end 13 and grip end 11 with generally circular cross sections and a teardrop shape is preferred in the center sections. This provides a superior aerodynamic section, reducing drag because of the form. These shapes are complex and difficult to mold by prior art methods.

In the prior art, the larger center section would be unable to be formed, or would require leaving a form in place, greatly increasing weight, with no commensurate increase in strength. Worse yet, if a foam core form is used there will not be sufficient compacting pressure and therefore much less strong laminates in the skin.

Another prior art method for forming such shapes would entail the cumbersome use of low temperature meltable metal alloy cores, or water soluble organic or inorganic (i.e. eutectic salt) cores. These core materials must be removed after cure by melting the core out at a temperature higher than the final cure temperature, or by washing out soluble materials. Both these types of core removal processes are time consuming, expensive, and not readily amenable to high volume production. Even if these problems can be tolerated, the other problems associated with the use of hard internal tooling are still present, as discussed previously. If a compliant outer pressurization, as by shrink tape, is used, then surface finish problems will be present. If a split line female mold is used then the problems associated with developing and controlling pressure will be encountered. These problems have been a deterrent to prevent mass production of shapes of the types described in this invention.

Figure 12:
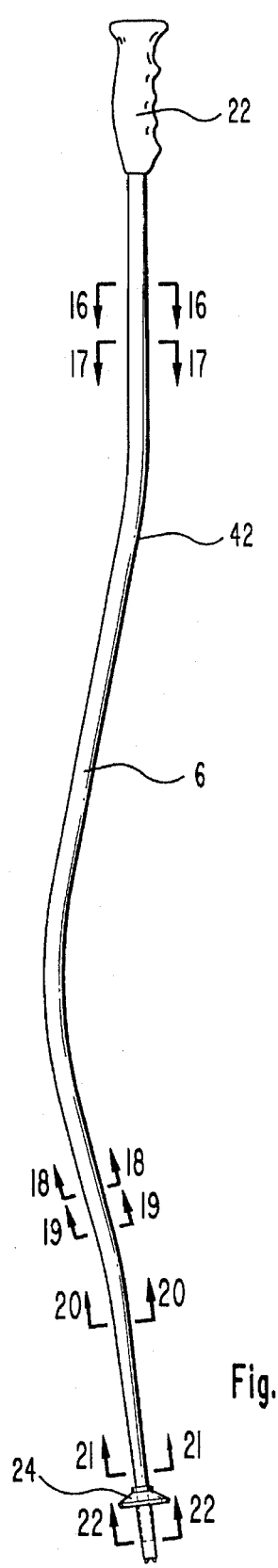
FIG. 12 is a side elevational view of a finished bent downhill ski pole.
Figure 13:
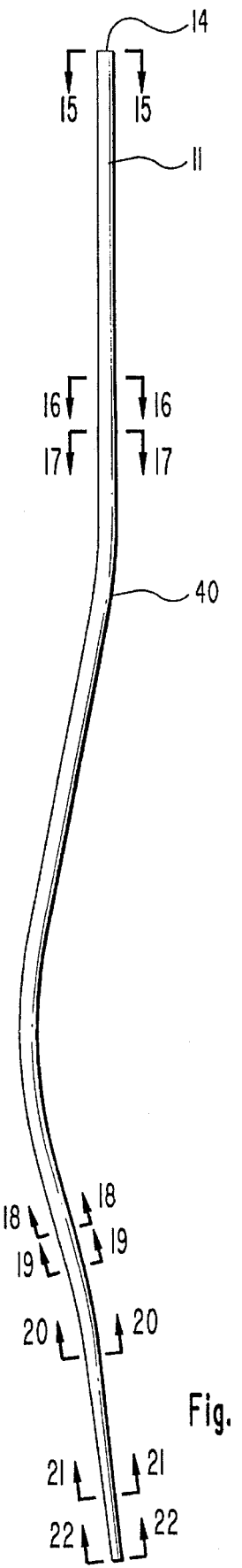
FIG. 13 is a side elevational view of a bent downhill ski pole blank before finishing.
Figure 14:
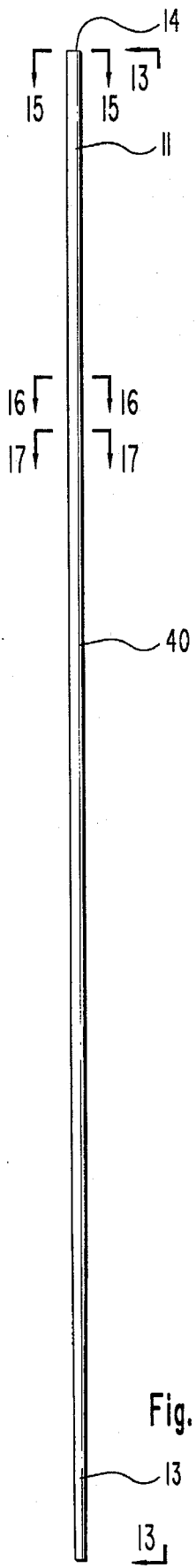
FIG. 14 is a top plan view of a bent downhill ski pole blank before finishing.
Figure 15:
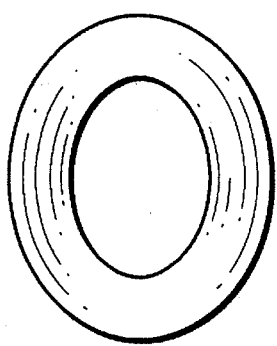
FIG. 15 is a sectional view of a bent downhill ski pole taken at line 15—15 of FIGS. 13 and 14 showing a generally elliptical shaped section.
Figure 16:
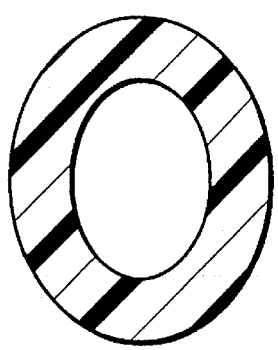
FIG. 16 is a sectional view of a bent downhill ski pole taken at line 16—16 of FIGS. 13 and 14 showing a generally elliptical shaped section.
Figure 17:
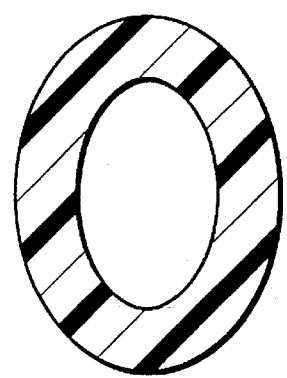
FIG. 17 is a sectional view of a bent downhill ski pole taken at line 17—17 of FIGS. 12, 13 and 14 showing a generally elliptical shaped section.
Figure 18:
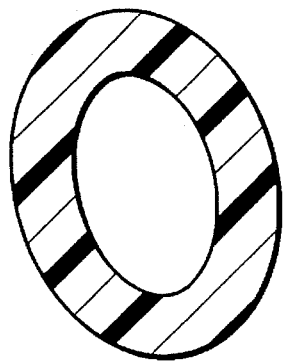
FIG. 18 is a sectional view of a bent downhill ski pole taken at line 18—18 of FIGS. 12 and 13 showing a generally elliptical shaped section.
Figure 19:
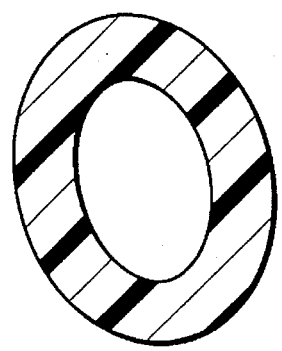
FIG. 19 is a sectional view of a bent downhill ski pole taken at line 19—19 of FIGS. 12 and 13 showing a generally elliptical shaped section.
Figure 20:
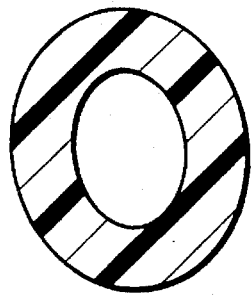
FIG. 20 is a sectional view of a bent downhill ski pole taken at line 20—20 of FIGS. 12 and 13 showing a generally elliptical shaped section.
Figure 21:
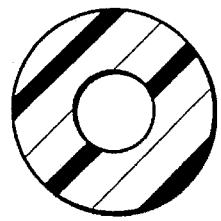
FIG. 21 is a sectional view of a bent downhill ski pole taken at line 21—21 of FIGS. 12 and 13 showing a generally round section.
Figure 22:
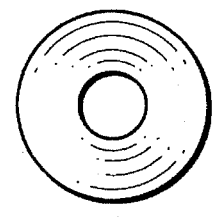
FIG. 22 is a sectional view of a bent downhill ski pole taken at line 22—22 of FIGS. 12 and 13 showing a generally round section.
Figure 29:
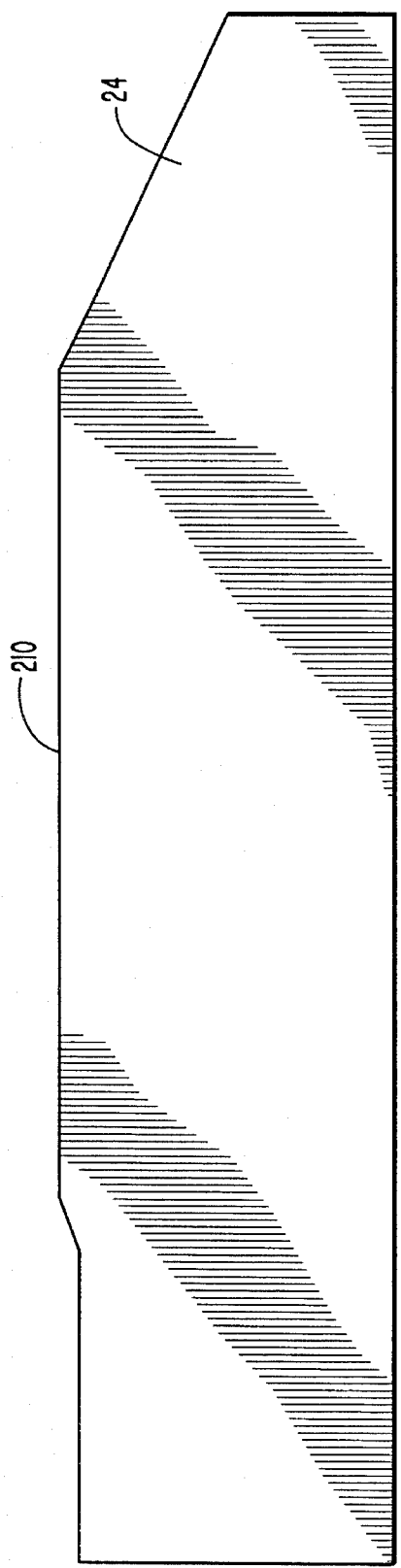
FIG. 29 is a top plan view of a first unidirectional fiber prepreg sheet used in forming the bent downhill ski pole.
Figure 30:
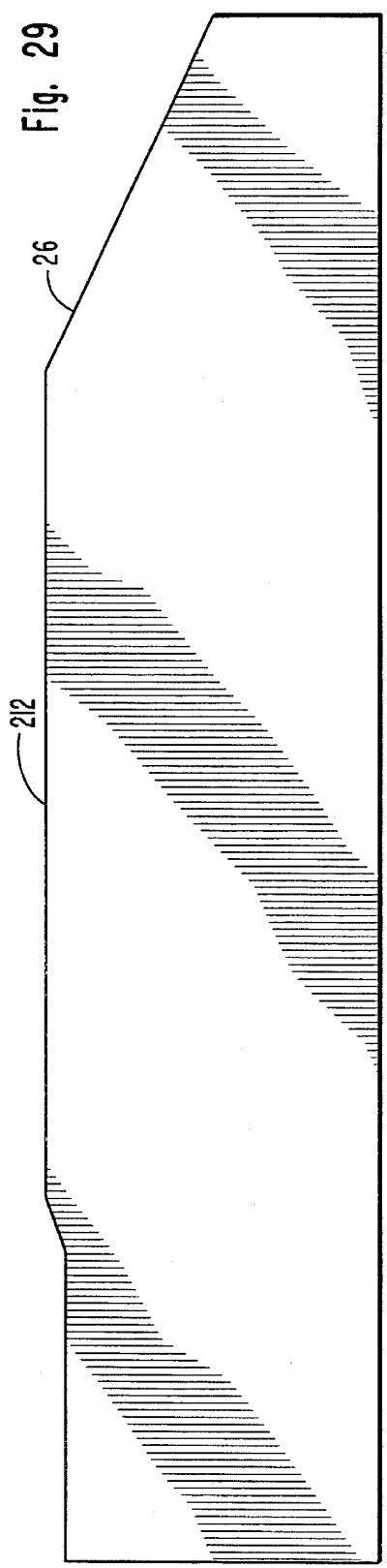
FIG. 30 is a top plan view of a second unidirectional fiber prepreg sheet used in forming the bent downhill ski pole.

FIG. 13 shows a bent downhill ski pole 40, with its shaft not trimmed to length. The finished bent downhill ski pole assembly 42 shown in FIG. 12 has the pole trimmed to length, shown as 125 cm. with a grip 22 and basket assembly 28 on, as described above in connection with the straight pole.

FIGS. 15 through 22 show the tip end and grip end of the bent downhill ski pole with generally circular cross sections, and an elliptical shape is preferred in the center sections. The elliptical section provide a superior aerodynamic section, compared to the circular section, reducing drag because of the form. The elliptical section also aligns the long axis of the ellipse in the direction of the longitudinal bend, thus providing a much stronger shape, and greater resistance to longitudinal compressive loads. Not only are these shapes are complex and difficult to mold by prior art methods, for the same reasons discussed in the straight, teardrop section poles, but other advantages are present, because of the properties of a bent pole, when such a longitudinal compressive load is applied. Prior art poles deflect so much under axial loading, which typically most severe at the beginning of a ski race, they must be made longer. Both the shape and molding process enabling the shapes increase strength and decrease weight. In this pole in particular, the method and structure are highly complementary.

FIG. 23 shows the mold half top 50 used for forming the straight aerodynamic ski pole, 10. The mold has two longer cavities 54 which are used for forming the larger three sizes, i.e. 135 cm., 130 cm., and 125 cm., and one shorter cavity 56 used for forming the smallest three ski pole sizes, i.e. 120 cm., 115 cm., and 110 cm. In the marketplace, the smaller three sizes might typically represent roughly 35% of the total size mix for alpine poles, therefore the mold produces roughly the correct mix of long and short ski pole shafts 10. The shapes are identical, except that 15 cm. has been removed from the middle section of the larger size pole 10 to obtain the smaller size pole shape. The relative mold thickness is about 0.5" thick.

The mold surfaces 60 are generally coated to reduce wear on the material from which they are made, preferably aluminum, and to enhance the mold release properties of the surface. Steel molds can also be used. This is a good mold material if the tools are operated continuously at the full cure temperature, since steel molds will experience less wear than aluminum. The invention enables this operation, not feasible in the prior art, because the bladder/preform assembly can be laid up separately from the mold.

A permanent commercial mold surface coating, such as, P117, applied by Techmetals, Inc. located in Dayton, Ohio, might be applied to aluminum mold surfaces to enhance release properties and reduce mold surface 60 wear. A mold release agent, such as, F23A, supplied by Axel Plastics Research Labs, located in Woodside, N.Y. is applied to the mold surface 60, generally immediately prior to loading a completed, but uncured, bladder/pole preform into the tool, as will be described later.

Returning now to FIG. 23, mold bottom half 64 for the straight aerodynamic ski pole 10 has mold handle 66 for moving, opening and closing the mold. The mold halves 50, 64 are indexed by mold match pin sets 68. These have a male pin 70 on top mold half 50, which aligns mold halves 50, 64, when mold the closed. The mold is operated by mold hinge 72 which allows mold halves 50, 64 to be opened and closed easily.

Formed in the bottom mold half 64 is resin flash cavity, 74 a basically semicircular recessed groove surrounding the mold cavity, 75 in the lower mold half 64. Flash cavity 74 is designed to capture the resin forced from the part during cure and compaction of the part. It pools the resin and allows easy cleaning of the mold between parts.

"O" ring groove 76 is a basically a square or rectangular groove surrounding the mold cavities 75 and flash cavities 75 which contains a rubber sealing "O" ring (not shown). This allows a vacuum to be applied to the mold cavities in the beginning portions of the cure. This feature is currently not used on a production basis.

Mold cavity 75 is the portion of the lower or bottom mold 64 against whose surface 82 the exterior of the part is formed. Both the top and bottom mold surfaces, 60, 82 and the related structures are adapted to include the area 86 occupied by the tag end areas of the parts, a recess 87 for accommodating the bladder fitting and the bladder tip seal (described later). The molds also have bladder fitting hole 100 providing a passage between the mold cavity 75 and the exterior of the tool for the bladder fitting pressure line tube 104.

FIG. 24 shows mold top half 106 for forming the bent downhill ski pole. This mates with mold bottom half 108 for the bent downhill ski pole.

In general, first a carbon/kevlar cloth is wrapped around a bladder, then the unidirectional layers, and then the carbon/carbon cloth. The bladder with the completed preform wrapped around it is then connected to the bladder fitting and the bladder tip seal is applied.

The specific steps in the lay-up of the straight aerodynamic pole laminations aligns the first unidirectional 110 and second unidirectional 112 layers comprised of unidirectional reinforcing fibers, which are strongest along their longitudinal axes, for desired structural strength, with woven bidirectional inner 114 and woven bidirectional outer 116 layers. These are laid-up over a bladder 233. Subsequently the bladder fitting assembly 118 and bladder tip seal 236 are connected to the bladder 233 to form a combined bladder/preform assembly 120 to be placed in the mold (64, 70 for a straight pole, 108, 106 for a bent pole). The following comprise the steps in the process of creating the finished, but uncured pole/bladder preform, 120. In the preferred embodiment of this method, beginning the rolling by placing the bladder around a steel rod, assists in manipulating the materials. This is only to accomplish the relatively loose rolling of the method, owing to the stiffness of the prepreg sheets, and the narrowness of the resulting pole, and this rolling rod is removed before placing the bladder/preform assembly in the mold. A commercial rolling table might be adapted to this task as well.

Inner sheet 114 of the straight aerodynamic ski pole is a woven carbon/kevlar cloth. This is a hybrid cloth containing both kevlar and carbon fiber in which the kevlar fiber is oriented circumferentially. The most commonly encountered stress state in the inner ply 114 of the pole 10 dictates that the carbon fiber in this ply 114 should be oriented longitudinally and the kevlar should be oriented circumferentially.

Cloth such as this is available commercially under the designations Hexcel X3909 x 1000 ES70. This cloth is typically comprised of high strength 33 msi. modulus carbon fiber such as Hercules Inc. AS4 and duPont Kevlar fiber with an epoxy resin comprising 38% to 42% of the material content by weight. The preferred fiber in this cloth weighs approximately 253 grams per square meter and uses a 3000 filament tow carbon fiber in a 3 or 4 harness weave. Other suitable cloths could be used. The shape, i.e. width of the inner sheet preform 114 along its length, is sized to produce a single layer of the carbon/kevlar cloth in the finished pole with about a 3/16" overlap.

The width variation is required because the pole 10 has the largest cross sectional diameter at the middle of the pole, with the top being smaller and the tip being the smallest. The inner sheet 114 is smaller than the outer sheet 118 because the circumference of the wall is smaller on the inside. Inner sheet 114 is the first sheet rolled around the bladder 233 in the correct sequence. After wrapping the other prepreg material sheets around the bladder 233 as described below, the bladder fitting assembly 118 and bladder tip seal 236 are connected to the bladder 233 to form a combined bladder/uncured preform assembly 120 to be placed in the mold (64, 70 for straight pole, 108, 106 for bent pole).

The next sheet is the first 110 of the two sheets of unidirectional carbon fiber prepreg tape material sheets used to form the axially oriented unidirectional fiber portion of the laminate for the straight aerodynamic ski pole (10). It is rolled around the bladder 233, and the woven inner layer 144 which has already been wrapped around the bladder 233. Next in the correct sequence a second prepreg material sheet 112 is then rolled therearound.

The fiber reinforced fabrics and unidirectional tapes, and the layup orientations selected for the ski poles as described in this invention are very specific to the requirements for alpine ski poles. The materials and layups which can be used with the present invention are by no means limited to those selected for the alpine ski poles describer herein. For example, the unidirectional tape could be applied at almost any angle to the pole centerline, and the sheets of these layers could be selected to avoid fiber termination except at the end of the poles, as described in the golf club shaft construction. For example, this invention has been used to construct very thick wailed rods with all the fiber oriented at ±45 degrees to the rod centerline, and without any fiber terminations inside the ends of the rod.

These sheets, 110, 112 are preferably unidirectional, available as Ciba Geigy 920 or Danutec Werkstoff Ges.m.b.H. EPI epoxy resins with a high strength 33 msi. carbon fiber such as Hercules AS4, Toray T700, or Amoco T300, preferably in 120 gr/m2 fiber areal weight, 38% to 40% resin content by weight. Specific product designations include: Ciba Geigy C-920-190/40% or Danutec Werkstoff Ges. m.b.H. Strafil C-EPI-120/38%.

Figure 31:
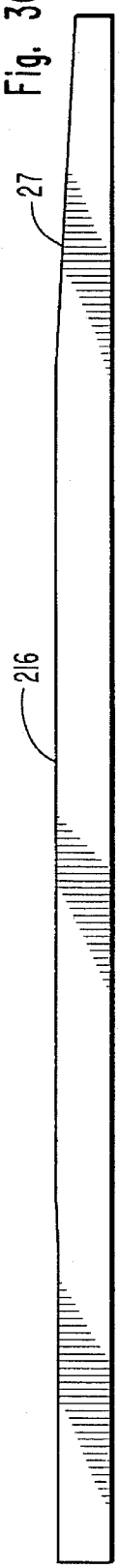
FIG. 31 is a top plan view of an outer layer of woven bidirectional fiber prepreg sheet used in forming the bent downhill ski pole.
Figure 32:
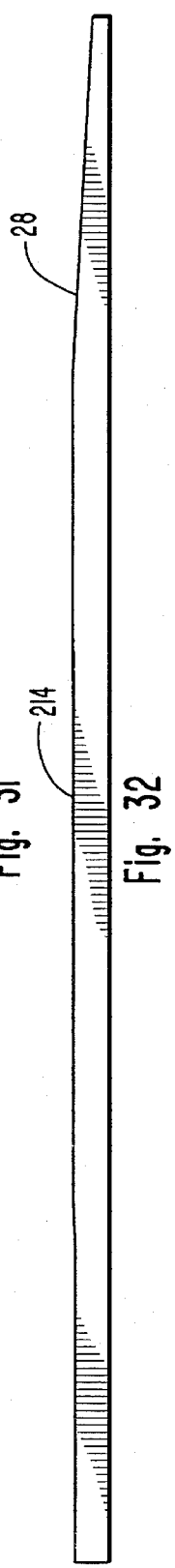
FIG. 32 is a top plan view of an inner layer of woven bidirectional multiple fiber prepreg sheet used in forming the bent downhill ski pole.

Sheet sizing is important to the wall thickness of the finished poles. The tapered sections at the top 126 and bottom 124 of the sheet 110 are sized to produce a constant wall thickness in the resultant part and are required because the finished pole 10 has the largest cross sectional diameter at the middle 128 of the pole, with the finished pole's top 11 being smaller and the tip 13 (shown in FIGS. 1 and 3) being the smallest diameter. These relative diameters are shown in FIGS. 4–11. Returning to FIG. 31, at the line of maximum width 134 of the straight aerodynamic ski pole unidirectional fiber prepreg tape material sheet 110 is 12" in preferred embodiment shown, with the length approximately 55".

Second sheet 112 is rolled around the combined bladder 233, inner sheet 114 and first preform sheet 110 in the described series of steps. The second 112 of the two sheets of unidirectional fiber prepreg tape material sheets completes the axially oriented unidirectional fiber portion of the laminate for the straight aerodynamic ski pole. This sheet 112 is similar in configuration to the first unidirectional sheet 110 except that it is exactly one half of the first unidirectional sheet 110, in this ski pole embodiment. It is rolled around the bladder assembly 118 inner sheet 114 and first unidirectional sheet 110 in the correct sequence with the other prepreg material sheets as the next step toward forming the completed bladder/pole preform assembly 120. The maximum width of the second unidirectional sheet 112 is 6" in the preferred embodiment shown and the length approximately 55".

The outer sheet 116 of the straight aerodynamic ski pole is a bidirectional woven prepreg carbon fiber cloth. This forms the outer layer of the straight aerodynamic ski pole. This material is available commercially as Hexcel 43192 x 1000 ES70 40%. It uses a high strength 33 msi. carbon fiber such as Hercules AS4, or Amoco T300, 190 gr/m2 fiber areal weight, 38% to 40% resin content by weight, 3000 filament tow, satin weave. The shape, i.e. width of the preform along its length, is sized to produce a single layer of the carbon cloth in the finished pole with about a 3/16" overlap. The width variation is required because the pole has the largest cross sectional diameter at the middle of the pole, 128 with the top 130 being smaller and the tip 132 being the smallest. It is rolled around the bladder 233 and other sheets last, in the sequence described, around the other prepreg material sheets 110, 112 to form the completed uncured bladder/pole preform assembly 120.

It will be noted, that in this preferred embodiment, a carbon/carbon cloth is used. Because of the smooth exterior surface produced, however, an exterior sheet 116 of Kevlar or Kevlar/carbon cloth could be used in the invention, while such a different cloth could not be used in the prior art processes such as table rolling, because Kevlar cloth cannot be sanded to a smooth surface because of the properties of the Kevlar. This is yet another advantage of the invention.

The following steps describe the preparation of the laminations for the bent downhill ski pole. As with the straight pole, first unidirectional sheet 2 10 and second unidirectional carbon fiber sheet 212 are sandwiched between inner layer 214 of carbon/kevlar cloth and outer layer 216 of bidirectional carbon cloth. All these layers are laid up around bladder 233. Subsequently the bladder fitting assembly 118 and bladder tip seal 236 are connected to the bladder 233 to form the completed, but uncured, bent pole bladder/pole preform assembly 220.

First is an inner layer 214 of the bent downhill ski pole, which is woven carbon/kevlar cloth. This hybrid cloth of kevlar and carbon fiber has the kevlar fiber is oriented circumferentially. This is the same material as used for the corresponding inner layer 114 of the straight aerodynamic pole described above.

The shape, that is the this width of the preform along its length, is sized to produce a single layer of the carbon/kevlar cloth in the finished pole with about a 3/16" overlap. A width variation is required because the pole has the largest cross sectional diameter at the middle of the pole, with the top being smaller and the tip being the smallest. The inner sheet 214 is smaller than the outer layer 216 because the circumference of the wall is smaller on the inside. It is rolled around the bladder 233 in the correct sequence the other prepreg material sheets. Subsequently the bladder fitting assembly 118 and bladder tip seal 236 are connected to the bladder 233 to form the bladder/pole preform assembly. This sheet 214 is rolled around the bladder/pole preform assembly first.

The first unidirectional sheet 210, of two sheets of unidirectional carbon fiber prepreg tape material sheets is used to form the axially oriented unidirectional fiber portion of the laminate for the bent downhill ski pole. This layer is rolled around the bladder 233 in the correct sequence, that is after the inner layer 214. In the preferred embodiment this is a commercial product such as Danutec Werkstoff Ges.m.b.H. Strafil C-M40J-EPI-110/38% It uses a high strength high modulus 55 msi. modulus carbon fiber such as Amoco M40 or Hercules HMS, in a 110 gr/m2 fiber areal weight, with a 38% to 40% resin content by weight.

The tapered sections at the top and bottom of the sheet are sized to produce a constant wall thickness in the resultant part and are required because the pole has the largest cross sectional diameter at the middle of the pole, with the top being smaller and the tip being the smallest. This sheet is rolled around the bladder/pole preform assembly after inner carbon/kevlar cloth sheet 214. The maximum width of bent downhill ski pole first unidirectional fiber prepreg tape material sheet 210 for the bent downhill ski pole is 12" in the preferred embodiment shown with a length approximately 57".

Second sheet 212 of the two sheets of unidirectional carbon fiber prepreg material used in the bent downhill ski pole unidirectional completes the two layer axially oriented unidirectional fiber portion of the skin. This is identical to sheet 210. It is rolled around the bladder assembly in the correct sequence with the other prepreg material sheets to form the bladder/pole preform assembly. This sheet is rolled around the bladder/pole preform assembly after the first unidirectional sheet 210.

The outer layer 216 of the bent downhill ski pole is bidirectional woven prepreg carbon fiber cloth, the same material as used for the corresponding outer layer 116 of the straight aerodynamic pole described above. The shape of outer cloth 216, specifically the width of the preform along its length, is sized to produce a single layer of the carbon cloth in the finished pole with about a 3/16" overlap. The width variation is required because the pole has the largest cross sectional diameter at the middle of the pole, with the top being smaller and the tip being the smallest. Outer sheet 216 is rolled around the bladder assembly last, after the second unidirectional sheet 212.

FIGS. 33, 34 and 35 show the bladder membrane and bladder fitting assembly arrangement. Silicone rubber outer seal 229 slides over tube or fitting 230 having the barbed end 232, over which the after the end the bladder membrane 233 is slid. Seal 229 functions to clamp the bladder membrane 233 tightly to the barbed end fitting 232 after the mold is closed. Thermal expansion of the silicone rubber further increases the clamping effect as the mold 50, 64 and rubber outer seal 229 heat up. The seal is typically cast from silicone, such as available from Dow Corning, of Midland, Mich. as Silastic 591 liquid silicone rubber.

In an alternative embodiment, a rigid metal, preferably aluminum, outer seal can be machined to fit against the interior mold cavity wall and press against the bladder and barbed end fitting. In this case the barbed end fitting is shaped differently, having more of a rounded bulb shape, and the outer seal has a tapered conical section.

Bladder fitting assembly or tube 230 conveys fluid pressure to the inside of the bladder membrane 233 during cure.

Tube 230 connects the bladder 233 inside the mold 50, 64 to an external fluid pressure source, preferably air. This can be connected to a standard commercial air hose coupling 234, or other suitable connection.

In another embodiment, the effectiveness of pressure applied through the bladder fitting 230 is augmented with an additional vacuum line to create a vacuum in the area outside the bladder and inside the "O" ring groove 76 (shown in FIG. 23) in the case that application of a vacuum is desired. In this case, the shape of the bladder fitting tube 230 is modified and a cast silicone seal is added in the area where the "O" ring groove 76 crosses the bladder fitting tube to provide a positive seal for the vacuum application. An "O" ring (not shown) must be mounted in the "O" ring groove 76 also.

The bladder membrane 233 is preferably an elastic material which can withstand the cure temperature (about 300 degrees Fahrenheit (F.) to 350 F. maximum) and preferably has properties amenable to preventing the bonding of the bladder to the interior of the pole during cure. The bladder is typically removed from the pole after cure, and sometimes is reused. The lightest bladders found suitable are on the order of 8 gr. which is a significant, although not overly large weight to leave in the pole.

The bladder membrane 233 material is preferably elastic because it allows the bladder to conform to the interior contours of the part as it is being expanded and compacted. While bladders constructed of relatively inelastic materials could be constructed, it is believed these materials are not optimum because some small level of bridging tends to occur since the bladder can not always slide easily on the interior of the part. This in turn enables localized areas of lower compaction pressure to form.

A thin walled silicone tubing is used in the preferred embodiment of the invention, such as produced by North American Reiss, Blackstone, Va. Several sizes of this silicone tubing have been used successfully, the specifications include: Durometer 60±5, tolerances per RMA CL2 SIL A2.

Silicone tubing is available from a variety of manufacturers, and costs are relatively small. These bladders are cost effective when only used once, but have been used successfully for over ten poles. The silicone bladder shown in the figures has a 0.35" outer diameter and a 0.015" thick wall.

A mold release agent or "wax" can also be used on the bladder by dipping the bladder into the mold release agent. A typical mold release is a Miller Stephenson Chemical Company Inc., Danbury, Conn. product, product number MS-143N TFE Release Agent-Dry Lubricant. Use of a mold release agent allows easier removal of the bladder from the part, and is valuable if the bladders are to be reused several times.

Thin film thermoplastic bladders can also be used. The films can be purchased in a tubing form, or flat sheets of the film can be heat sealed to the desired shape. An example is Wrightlon film available from Airtech International Plastics of Carson, Calif.

A formed rubber bladder can also be used. In this case the bladders are shaped to resemble the part. This allows high compaction pressures to be applied to the inside of the laminate for shapes with greatly varying cross section.

A variety of processes can be used for fabricating the formed rubber bladders. These include conventional rotational molding inside female tooling. The formed rubber bladders can also be sprayed or cast over a mandrel shaped to the inner dimensions of the bladder. The inner mandrel is then either dissolved for melted out, leaving the bladder intact. These specialized bladders can be removed from the parts and reused.

Heat sealed thermoplastic film bladders can be fabricated in a process similar to that used commonly for industrial heat sealing of thermoplastic films. Common applications include children's inflatable toys, air mattresses, beach balls, etc. The thermoplastic films used for pole fabrication must withstand the elevated curing temperatures used, and the heat sealing processes must be modified to handle the higher temperature films. It is desirable to select thermoplastic films which do not adhere to the composite material during cure to allow simple removal of the bladder. These bladders can used several times, but their low cost also allows them to be discarded after each use.

Lower elongation thermoplastic bladders, that is relatively inelastic bladders, cannot conform to the inside shape of the part, and therefore do not supply a uniform compaction pressure, and applies no pressure at all to some areas. These lower elongation thermoplastic bladders are also restricted to low inflation pressures which greatly reduced laminate compaction pressure. Use of a lower elongation, hence a non-conforming, bladder membrane at relatively high inflation pressures can cause the bladder to burst.

A bladder tip seal 236 must be used if a continuous extruded bladder material is used, such as extruded silicone tubing, or extruded thermoplastic film. A cast silicone fitting similar to the silicone rubber outer seal portion of bladder fitting assembly 218 can be used, where the inner barbed end 232 is of course much smaller and would be solid with no through hole.

Alternatively, a silicone tape 238 can be wound around the end of the bladder without anything placed inside the bladder tip end. The silicone tape used in the preferred embodiment is: "Level Wrap Self Adhering Tape-Red", Mocap Inc, 10964 Lin-Valle Drive, St. Louis, Mo., 63123.

In FIG. 36, an alternative to using the cast silicone outer bladder seal 229, is to use the silicone rubber sealing tape 240 as can be used on the bladder tip seal 236. The tape is wrapped around the bladder membrane 233 and barbed end 232 after the end the bladder membrane 233 is in place thereon. As with the cast silicone rubber fitting, 229 it functions to clamp the bladder tightly to the barbed end 232 after the mold is closed.

The bladder fitting end 242 of the mold cavity contains the bladder fitting 230, and a small, approximately ⅜" long tag end is also formed here. The pole tip end 244 of the mold cavity contains the bladder tip seal 236. A small, approximately ⅜" long of part tag end is also formed here.

The completed bladder assembly 118, 218 includes the bladder membrane 233, the bladder tip seal 236, and the bladder fitting 230. The pole preform is typically formed on the bladder alone by rolling the various prepreg material sheets 110, 112, 114 and 116 for the straight aerodynamic ski pole, and 210, 212, 214 and 216 for the bent downhill ski pole, onto the bladder membrane 233.

The tip seal 236 and bladder fitting 230 are then attached, and then the entire bladder assembly/pole preform 120, 220 is loaded into the mold. Air or nitrogen is used for pressures of up to 250 psig. in the preferred embodiment of this invention because they require no clean up during or after use. A fluid with a high vaporization temperature can be used when higher pressures are used because the reduction in stored energy with the fluid produces a safer process.

As described above, an advantage to the use of a completed, uncured bladder/preform assembly 120 having a diameter substantially less than the mold cavity 75, is that it can be laid up somewhat remotely from the mold, in time and distance, to facilitate production line circumstances. Further, as will be described below, the ability to use the bladder/preform assembly with this relative sizing provides manufacturing and structural advantages in reduction of flash, and particularly the serious structural problem of capturing reinforcing fibers in the mold joint, thereby severing their continuing. These problems are present in even the best prior art methods.

Figure 37:
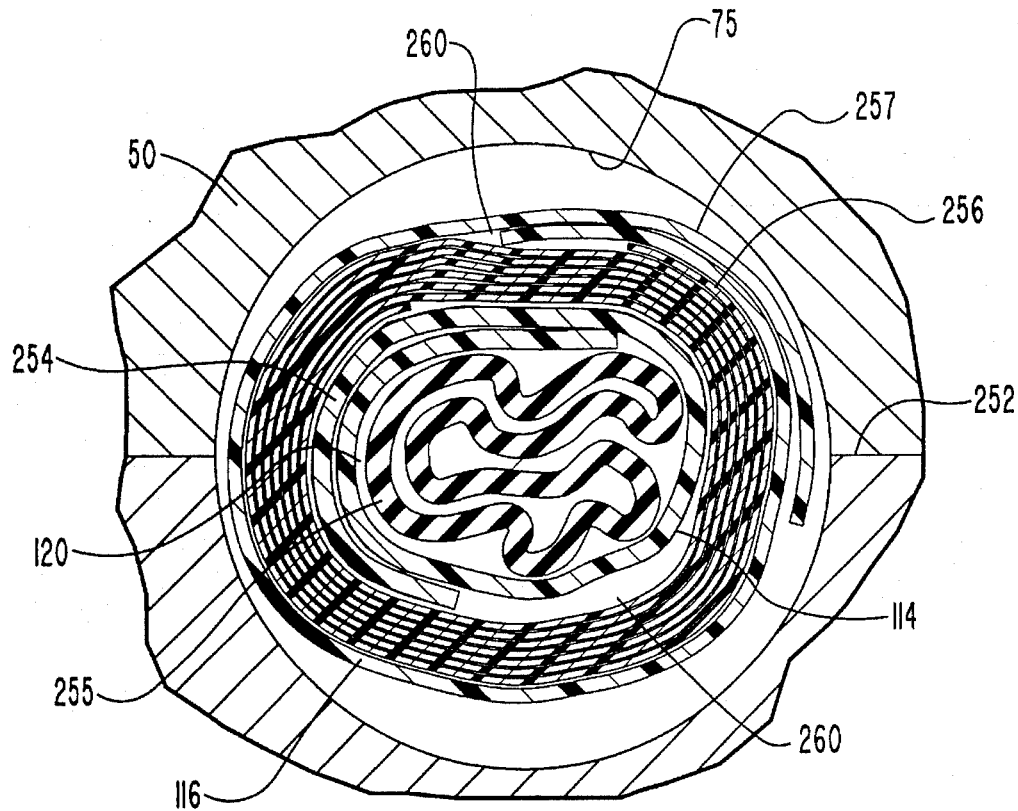
FIG. 37 is a sectional view of the uncured bladder/preform assembly in position in a closed mold.
Figure 39:
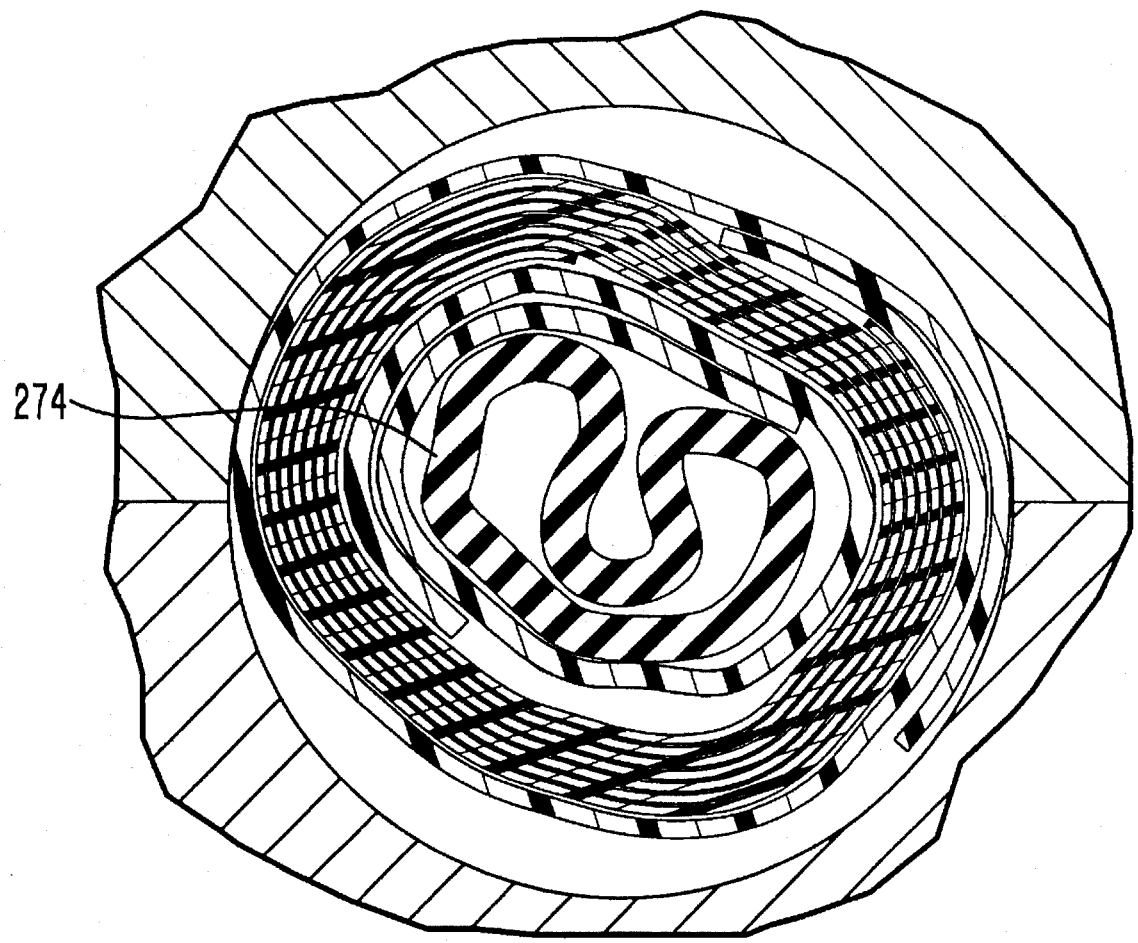
FIG. 39 is a sectional view of an alternative uncured bladder/preform assembly in position in a closed mold.

For a larger diameter, thinner walled bladder, such as shown in FIG. 37, the bladder is folded over onto itself, yet still permitted to expand on inflation without kinking or fouling. Certain different folding properties exist when using a smaller diameter thicker walled extruded silicone rubber bladder. As shown in FIG. 39, fewer folds are present, and the thickness of the bladder fills the interior space.

FIG. 37 illustrates a cross section of the tip of the straight aerodynamic ski pole preform. The bladder/preform assembly 120 or 220 is within the mold haves 50, 64 or 106, 108 respectively. The straight aerodynamic ski pole preform construction process is shown for illustration. The process for the bent downhill ski pole is similar.

The mold face surface lying between the mold cavity 75 and the flash cavity 74 is referred to as the pinch landing 252. This area of the mold face seals the edges of the mold cavity 75. The pinch landings are on both mold halves 50, 64 for the straight pole and 106, 108 for the bent pole mate closely with each other to minimize the part flash. This part of the mold will experience a fast rate of wear if fiber flash is formed during mold loading.

The inner layer of prepreg carbon/kevlar hybrid material 114, when rolled, has edges which form an overlapping joint 254. It will be noted the bladder membrane described during layup at numeral 230 is flattened, folded, and then crumpled to reduce its volume thereby forming a crumpled bladder membrane 255. Thus inner layer 114 is rolled on crumpled bladder membrane 255.

The two sheets of unidirectional fiber prepreg material sheets 110, 112 are rolled around the preform as described above. Because of the properties of a unidirectional prepreg sheet, namely the sheet being simply a series of fibers running in a single direction, with no crossing fibers, held together by the uncured resin coated thereon, even the slight pressure of rolling caused the fibers at what were formerly edges of the sheets to merge with the adjacent sheet. This creates in effect a single continuous layer, as the unidirectional fibers are displaced adjacent one another, and the plastic resin is a continuous medium. Thus, there are no overlaps or joints in the uncured combined unidirectional fiber prepreg layer 256. The outer layer of prepreg cloth material 116 (old 22) is shown rolled onto the preform. Since this has crossing fibers, somewhat defined edges are present, forming an overlapping joint 257. Inter-lamination voids 260 between the sheets are apparent, and are difficult to avoid with even the most careful lay-up of laminations. However, interlamination voids 260 do not have any detrimental effect when using the methods of this invention because they squeezed out by the high bladder pressures during cure. The alternative step of applying a vacuum to the mold would further assist in reducing voids. Next, the bladder/preform 120 is placed in the mold 50, 64 (old 7,8) and the mold is closed. At this point curing begins.

The closed mold is typically placed in a low-cost pneumatically actuated press which tightly clamps the two mold halves together. Said press would also typically contain heating platens, usually of the resistive electrical type.

Figure 38:
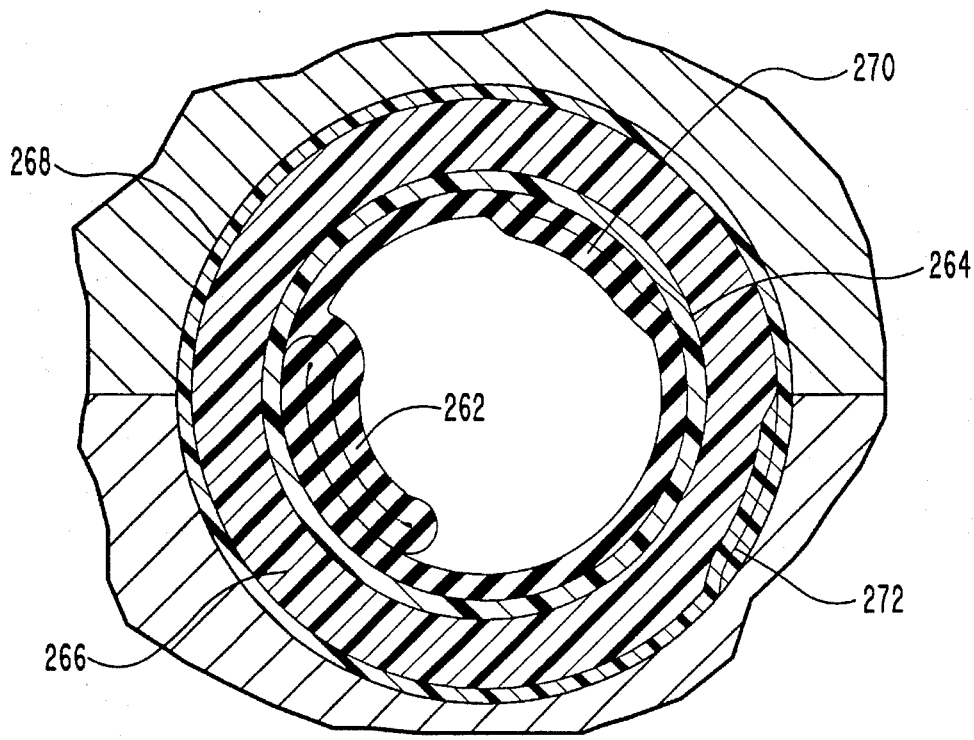
FIG. 38 is a sectional view of a cured pole with an inflated bladder in position in a closed mold.

Heating of the mold begins immediately after the press is closed. The internal bladder 233 would be pressurized at this point also. It has been found that releasing and repressurizing the bladder several times at the beginning of the cure cycle aids in expanding the pole preform to the mold walls. The action of releasing and repressurizing the bladder several times has the effect of working or kneading the preform outward to the mold walls. This varying pressurization would typically be stopped and maintained at the full bladder pressure at perhaps 200 degrees F., if the mold is heated from near room temperature, or it would be stopped after 10 to 20 pulses if the mold starts at an elevated temperature, even the full cure temperature. The mold is heated as fast as possible to expedite the processing. Heatup rates from 5 to 30 degrees F. per minute have been used. The final high temperature hold is preferably about 300 degrees F., but could range from 250 to 325 degrees F. with the epoxy resins described herein. The mold temperature would then be held at preferably 300 degrees F. for about 10 minutes. At this point the poles have been fully formed and cured. The press clamping the molds is opened and the mold is slid out of the press. The mold can be opened and the poles immediately removed if care is taken since the mold and poles are at a high temperature. Typically the mold surfaces would be cleaned immediately of any resin flash, and another coat of mold release applied for the next set of poles to be molded. The mold can either be loaded with bladder/uncured pole preforms while it is still hot, or it can be cooled first. Now showing the curing and compaction step, FIG. 38 is a cross section of the tip of the straight aerodynamic ski pole preform in the closed mold near the end of the cure. The folded bladder membrane (255 of FIG. 37) is inflated. This inflated or pressurized bladder membrane 262 fully contacts and presses outwardly on the laminations 110, 112, 114 and 116. These laminations are simultaneously both expanded circumferentially from their rolled state, and compressed or compacted together to form a skin being smooth and strong in its interior and exterior surfaces, and having a low void, substantially uniform density, continuous, bonded plastic composite matrix, reinforced by high strength fibers aligned to bear substantial loads. The laminations 110, 112, 114 and 116 are not only compressed outwardly to substantially eliminate voids 260, but expand circumferentially, as can be seen, for example, by comparing the uncured overlapping joints 254, 257 to the finished joints 270, 272.

The bladder circumference of this particular bladder membrane 255 is larger than the inner circumference of the tip of the straight aerodynamic ski pole, therefore since this section is at the tip, the bladder is still partially folded over on itself. The bladder circumference is smaller than the inner pan circumference in the middle and top portions of the pole and therefore the bladder does not fold over but stretches in these areas.

In the cured pole, since the resin in all prepreg layers is the same plastic, the entire skin is in reality a continuous plastic matrix. However, the reinforcing fibers remain in substantially the same relative locations, thereby varying the strength properties of the skin as one looks diametrically outwardly. Thus, the circumferentially oriented kevlar fibers in cured inner kevlar/carbon hybrid reinforce portion 264 of the skin provides resilience, strength and toughness against crushing. The kevlar in this layer has been found to add considerable toughness and impact resistance since the inner layer is loaded primarily in tension during a crushing or impact type of loading. The longitudinally oriented carbon fiber in this ply adds strength and stiffness in bending relative to the longitudinal axis of the pole. The cured central unidirectional carbon fiber reinforced portion 266 provides great strength and longitudinal stiffness, and the outer carbon fiber cloth reinforced portion 268 also provides resilience and strength and against crushing and against loads in shear relative to the longitudinal axis of the pole.

The outer circumferentially oriented fibers have been found to be in compression during a crushing or impact type load, and therefore carbon fiber is used here because it has significantly better compression strength properties than kevlar. This outer portion 268 also substantially reduces the likelihood of splintering of the longitudinal fiber reinforce portion 268, which has been a problem in the prior art.

As described above, the method herein could be utilized with other fibers, more particularly suited to desired traits of the finished pole such as flexibility, fatigue resistance, stiffness and strength in various directions, as well as other physical and economic properties.

FIG. 39 shows the completely assembled preform using the alternative thicker walled bladder 274 in the tip of the straight aerodynamic ski pole tool. The extruded silicone bladder cross section is shown in a crumpled shape. This product is available from North American Riess Co. having a 0.24" outer diameter and a 0.030" thick wall. The thicker wall stretches more than the thinner wall. The bladder 274 is shown crumpled in the center of the preform.

We claim:

1. A method for making a composite pole comprising;
    (a) forming a skin of fiber material impregnated with heat curable resin around a flexible substrate comprising a pressurizable bladder;
    (b) positioning the skin and flexible bladder substrate in a female mold,
    (c) pressurizing the bladder to circumferentially expand the skin to internal walls of the female tooling and to apply pressure to an inside surface of the skin,
    (d) curing the resin of the skin to a substantially hard state while maintaining pressure in the bladder to form a pole with external dimensions determined by the internal walls of the female mold, and
    (e) removing the pole from the female mold.

2. The method of claim 1 wherein the skin is formed in (a) by placing a fiber material that has been previously impregnated with resin around the flexible substrate.

3. The method of claim 1 wherein the skin is formed in (a) by placing a fiber material around the flexible substrate and impregnating the fiber with resin.

4. The method of claim 2 wherein the skin in (a) is undersized with respect to the inner dimensions of the female mold.

5. The method of claim 2 wherein the female mold is constructed and configured such that the internal walls have a plurality of contours, and the female mold has a first female portion and a second female portion, the first and second female portions being matable with respect to one another so that when the skin and the flexible substrate may be placed the first portion, and the second portion mated therewith for pressurization and curing.

6. The method of claim 1 wherein the skin comprises a plurality of fiber laminations laid up separately, the laminations composed of directionally oriented fibers oriented in the direction of strength of the finished pole, any voids being substantially eliminated in step (c) such that the resin form a substantially homogeneous matrix surrounding the fibers.

7. The method of claim 1 additionally comprising the step of applying a vacuum to the mold before step (d).

8. The method of claim 1 wherein the interior surface of the female molding provides a smooth exterior surface upon the pole upon removal from the mold.

9. The method of claim 6 wherein the cured skin has a substantially constant, selected thickness and is substantially free of voids.

10. The method of claim 1 wherein the female mold is constructed and configured to provide a pole having first and second locations with first and second circumferences and a third location intermediate the first and second locations having a third circumference larger than the first circumference and the second circumference.

11. The method of claim 1 wherein the female mold is constructed and configured to provide a pole having a curved or bent centerline at some location along its length.

12. The method of claim 1 wherein the female mold is constructed and configured to provide a pole having s noncircular cross-section along at least part of its length.

* * * * *